(12) United States Patent
Han et al.

(10) Patent No.: US 11,736,712 B2
(45) Date of Patent: Aug. 22, 2023

(54) METHOD AND APPARATUS FOR ENCODING OR DECODING VIDEO SIGNAL

(71) Applicant: INDUSTRY ACADEMY COOPERATION FOUNDATION OF SEJONG UNIVERSITY, Seoul (KR)

(72) Inventors: Jong-Ki Han, Seoul (KR); Jae-Yung Lee, Gwacheon-si (KR)

(73) Assignee: Industry Academy Cooperation Foundation of Sejong University, Seoul (KR)

( * ) Notice: Subject to any disclaimer, the term of this patent is extended or adjusted under 35 U.S.C. 154(b) by 235 days.

(21) Appl. No.: 16/305,214

(22) PCT Filed: May 26, 2017

(86) PCT No.: PCT/KR2017/005497
§ 371 (c)(1),
(2) Date: Nov. 28, 2018

(87) PCT Pub. No.: WO2017/209455
PCT Pub. Date: Dec. 7, 2017

(65) Prior Publication Data
US 2020/0296403 A1 Sep. 17, 2020

(30) Foreign Application Priority Data

May 28, 2016 (KR) .......................... 10-2016-0066015
Jun. 17, 2016 (KR) .......................... 10-2016-0075723
(Continued)

(51) Int. Cl.
*H04N 19/513* (2014.01)
*H04N 19/573* (2014.01)

(52) U.S. Cl.
CPC ......... *H04N 19/513* (2014.11); *H04N 19/573* (2014.11)

(58) Field of Classification Search
CPC .. H04N 19/513; H04N 19/573; H04N 19/119; H04N 19/122; H04N 19/129; H04N 19/176; H04N 19/18; H04N 19/52
(Continued)

(56) References Cited

U.S. PATENT DOCUMENTS 9,350,996 B2 * 5/2016 Fang ....................... H04N 19/91
2012/0027088 A1 * 2/2012 Chien .................. H04N 19/159
375/240.15
(Continued)

FOREIGN PATENT DOCUMENTS

KR 10-2012-0059334 A 6/2012
KR 10-2012-0082375 A 7/2012
(Continued)

OTHER PUBLICATIONS

Moon et al.(Machine translation of KR 20120059334 A, cited in IDS by Applicant) (Year: 2012).*
(Continued)

*Primary Examiner* — Christopher S Kelley
*Assistant Examiner* — Ana Picon-Feliciano
(74) *Attorney, Agent, or Firm* — NSIP Law

(57) ABSTRACT

The present invention relates to a video signal decoding method and apparatus therefor. A decoding method according to an embodiment of the present invention comprises: setting a structure of a coding block constituting a current image; setting a structure of transform blocks corresponding to the coding block; and generating a prediction signal by using the transform blocks, and wherein the coding block includes any one or more blocks of a square block and a non-square block.

16 Claims, 40 Drawing Sheets

(30) Foreign Application Priority Data

| | | |
|---|---|---|
| Jun. 17, 2016 | (KR) | 10-2016-0075787 |
| Mar. 21, 2017 | (KR) | 10-2017-0035361 |
| Apr. 14, 2017 | (KR) | 10-2017-0048441 |
| May 16, 2017 | (KR) | 10-2017-0060576 |

(58) Field of Classification Search
USPC .................................................... 375/240.16
See application file for complete search history.

(56) References Cited

U.S. PATENT DOCUMENTS

| | | | | |
|---|---|---|---|---|
| 2012/0230417 | A1* | 9/2012 | Sole Rojals | H04N 19/436 |
| | | | | 375/240.18 |
| 2013/0034161 | A1* | 2/2013 | Sugio | H04N 19/139 |
| | | | | 375/240.16 |
| 2013/0301705 | A1* | 11/2013 | Seregin | H04N 19/18 |
| | | | | 375/240.02 |
| 2013/0329807 | A1* | 12/2013 | Lim | H04N 19/176 |
| | | | | 375/240.18 |
| 2014/0328388 | A1* | 11/2014 | Kim | H04N 19/513 |
| | | | | 375/240.02 |
| 2018/0070090 | A1* | 3/2018 | Lee | H04N 19/157 |
| 2019/0089961 | A1* | 3/2019 | Ahn | H04N 19/159 |
| 2020/0374529 | A1* | 11/2020 | Ahn | H04N 19/157 |

FOREIGN PATENT DOCUMENTS

| | | |
|---|---|---|
| KR | 10-2012-0100836 A | 9/2012 |
| KR | 10-2013-0005233 A | 1/2013 |
| KR | 10-2013-0069758 A | 6/2013 |
| KR | 10-2013-0085393 A | 7/2013 |
| KR | 10-2014-0049098 A | 4/2014 |
| KR | 10-2014-0057252 A | 5/2014 |

OTHER PUBLICATIONS

International Search Report dated Dec. 27, 2017 in related International Application No. PCT/KR2017/005497 (5 pages in English).

* cited by examiner

| TB 0 | TB 1 | TB 4 |
| TB 2 | TB 3 | TB 5 |

(with lower portion containing TB 6, TB 7, TB 8, TB 9, TB 10, TB 11, TB 12, TB 13, TB 14, TB 15, TB 16, TB 17)

FIG. 20
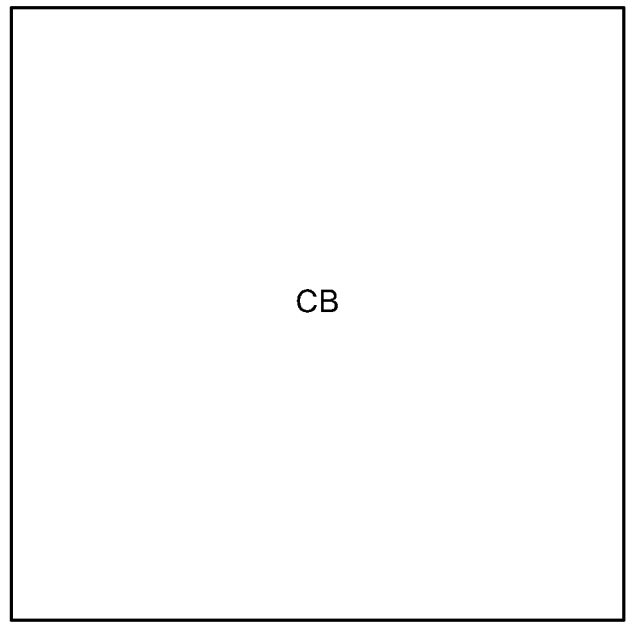
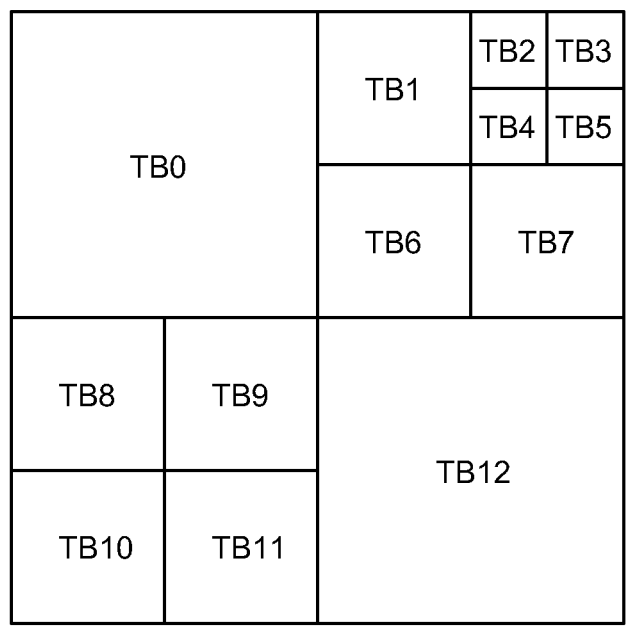

FIG. 23a

| CG 0 | CG 2 | CG 5 | CG 9 |
|---|---|---|---|
| CG 1 | CG 4 | CG 8 | CG 12 |
| CG 3 | CG 7 | CG 11 | CG 14 |
| CG 6 | CG 10 | CG 13 | CG 15 |

FIG. 23b

| CG 0 | CG 1 | CG 2 | CG 3 |
|---|---|---|---|
| CG 4 | CG 5 | CG 6 | CG 7 |
| CG 8 | CG 9 | CG 10 | CG 11 |
| CG 12 | CG 13 | CG 14 | CG 15 |

FIG. 23c

| CG 0 | CG 4 | CG 8 | CG 12 |
|---|---|---|---|
| CG 1 | CG 5 | CG 9 | CG 13 |
| CG 2 | CG 6 | CG 10 | CG 14 |
| CG 3 | CG 7 | CG 11 | CG 15 |

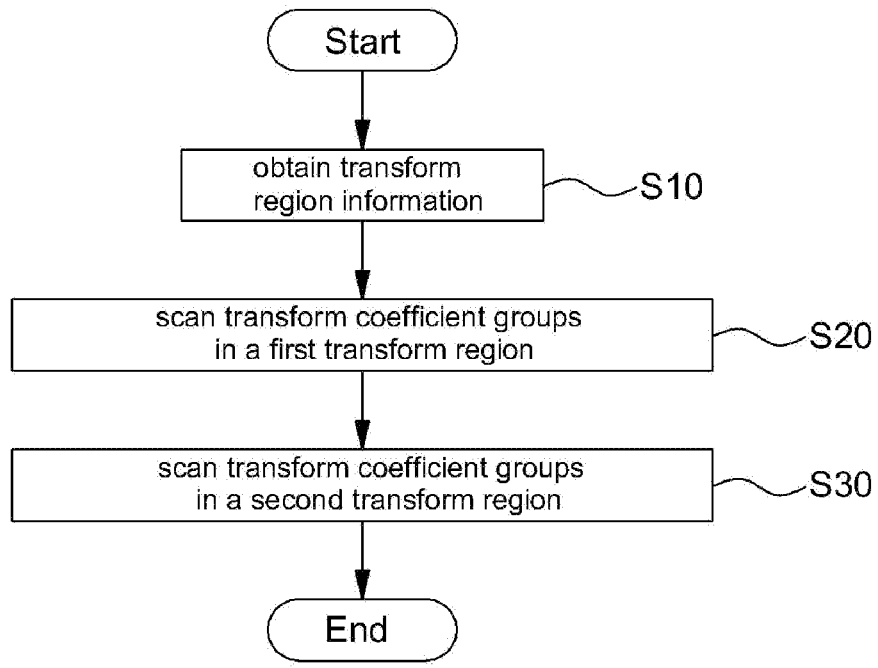
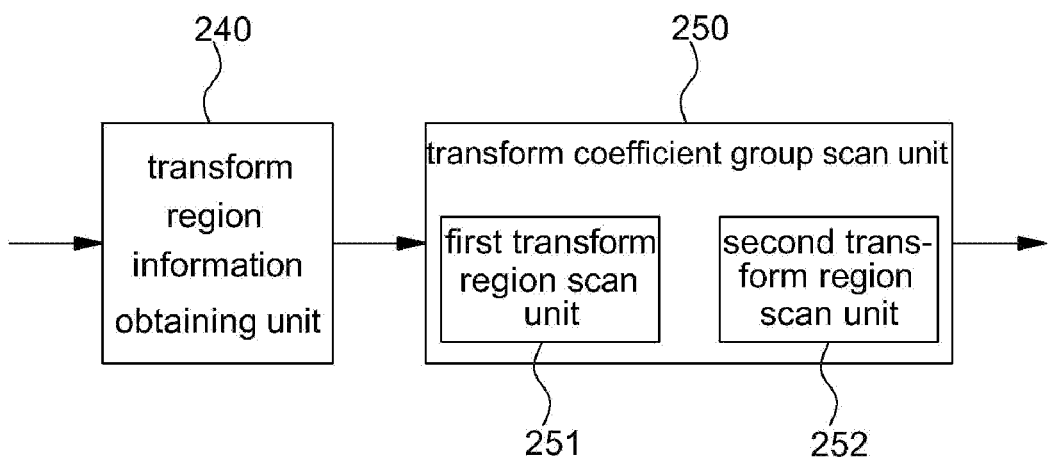

FIG. 29b

Up-Right

FIG. 29c

Vertical

Horizontal

Transform Block
(32x16)

FIG. 30b

|  281 |  |  |  | 282 |  |  |  |
|---|---|---|---|---|---|---|---|
| CG 0 | CG 2 | CG 5 | CG 9 | CG 16 | CG 18 | CG 21 | CG 25 |
| CG 1 | CG 4 | CG 8 | CG 12 | CG 17 | CG 20 | CG 24 | CG 28 |
| CG 3 | CG 7 | CG 11 | CG 14 | CG 19 | CG 23 | CG 27 | CG 30 |
| CG 6 | CG 10 | CG 13 | CG 15 | CG 22 | CG 26 | CG 29 | CG 31 |

Up-Right

FIG. 30c

|  281 |  |  |  | 282 |  |  |  |
|---|---|---|---|---|---|---|---|
| CG 0 | CG 4 | CG 8 | CG 12 | CG 16 | CG 20 | CG 24 | CG 28 |
| CG 1 | CG 5 | CG 9 | CG 13 | CG 17 | CG 21 | CG 25 | CG 29 |
| CG 2 | CG 6 | CG 10 | CG 14 | CG 18 | CG 22 | CG 26 | CG 30 |
| CG 3 | CG 7 | CG 11 | CG 15 | CG 19 | CG 23 | CG 27 | CG 31 |

Vertical

METHOD AND APPARATUS FOR ENCODING OR DECODING VIDEO SIGNAL

CROSS REFERENCE TO RELATED APPLICATION(S)

The present application claims priority under 35 U.S.C. 119(a) to the Korean application numbers 10-2016-0066015 filed on May 28, 2016, 10-2016-0075787 file on Jun. 17, 2016, 10-2016-0075723 filed on Jun. 17, 2016, 10-2017-0035361 filed on Mar. 21, 2017, 10-2017-0048441 filed on Apr. 14, 2017, and 10-2017-0060576 filed on May 16, 2017, which are herein incorporated by reference in its entirety.

BACKGROUND OF THE INVENTION

1. Field

The present invention relates to a method and apparatus for encoding or decoding a video signal, and more particularly, to a method and apparatus for encoding or decoding a video signal for improving coding efficiency.

2. Description of the Related Art

Recently, the demand for high resolution and high quality images such as a high definition (HD) image and an ultra high definition (UHD) image is increasing in various application fields. As the image data has high resolution and high quality bit by bit, the amount of data is relatively increased as compared with the conventional image data. Therefore, when image data is transmitted by using a conventional wired/wireless broadband line or stored by using an existing storage medium, the cost for transmission storage are increased. High-efficiency image compression techniques may be utilized to solve such problems caused by high-resolution and high-quality image data.

Video compression techniques include spatial prediction and/or temporal prediction to reduce or eliminate redundancy inherent in video sequences. In block-based video coding, a video frame or slice may be divided into blocks. Each block may be divided once again. Blocks in an intra-coded I frame or slice are encoded using spatial prediction for reference samples in neighboring blocks of the same frame or slice. Blocks in inter-coded P or B frames or slices may also use spatial prediction for reference samples in neighboring blocks of the same frame or slice, or temporal prediction for reference samples in different reference frames. The spatial or temporal prediction generates a prediction block for the block to be coded. The residual data represents a pixel difference between the original block to be coded and the prediction block.

Generally, in connection with the current block, an image is encoded using a square coding block (CU) and a transform block (TU) of the same size. Based on each coding block or prediction block size, the transform blocks are applied to a coding block as a quad-tree division structure. However, when the square coding block is used, since the prediction mode and the prediction information must be transmitted for each coding block, unnecessary information may be transmitted according to the type of the image, thereby reducing the coding efficiency. In addition, there is a disadvantage in that characteristics of an image corresponding to a coding block, and the characteristics of a residual signal generated according to a prediction mode may not be considered.

In addition, in a general video codec, the coding units of various sizes may be used and thus, it is possible to effectively perform encoding in consideration of spatial resolution and block characteristics of an image. Generally, when the image has a low resolution and the pixel value of the image is highly changed locally, the coding units having small size are used to perform effectively the intra prediction and inter prediction. In this way, when a coding unit of a small size is used, the amount of coding bits necessary is increased, but there is an advantage that the quantization error and the amount of bits necessary for coding the transform coefficients are reduced because the prediction is relatively accurate.

Conversely, in a region where the spatial resolution of the image is large or changes of the pixel values are small, a method using a large coding unit may increase the coding efficiency. In this case, even when a large coding unit is used, there is a tendency that a prediction error does not greatly increase as compared with a prediction method using a small coding unit. Therefore, when coding these blocks, it may be efficient to save the amount of transmitted bits by using a large coding unit. However, even if various coding units are used, there is a demerit that it is difficult to efficiently code various images having high resolution.

In video compression techniques for improving coding efficiency, the motion prediction is used to eliminate temporal redundancy between consecutive pictures. In order to detect temporal redundancy, a motion of a current block is prediction using a plurality of reference pictures, and a motion compensation is performed to generate a prediction block. A motion information includes at least one reference picture index and at least one motion vector.

Further, in order to acquire motion information, the current block performs bi-directional prediction to construct a prediction motion vector list of the current block, and based upon the vector list, a difference motion vector which is a difference value between the prediction motion vector and the motion vector of the current block may be transmitted to the decoder.

In this case, the prediction motion vector lists including the prediction motion vectors for each direction are independent from each other. However, as various sizes are used for inter-picture prediction, the relationships between the motion information of the current block and the motion information of one or more adjacent blocks increases. Therefore, according to the above-described conventional compression method, when the picture size is larger than the high-quality picture and various sizes are used for motion prediction and motion compensation, the compression efficiency of the motion information is lowered.

SUMMARY OF THE INVENTION

An object of the present invention is to provide an apparatus for encoding and decoding a video signal, which improves coding efficiency by using coding blocks and transform blocks having various shapes according to images.

Further, another object of the present invention is to provide a method of determining a coding order of a transform block capable of increasing a coding efficiency according to an intra-picture prediction mode of a current block, and a method and apparatus for encoding and decoding a video signal in order to perform the determining method.

An object of the present invention is to provide a method and a apparatus for decoding a video signal, which improve the coding efficiency of intra-picture prediction using transform blocks of various shapes.

Further, another object of the present invention is to provide a method and a apparatus for decoding a video signal capable of enhancing coding efficiency by first coding a transform coefficient group in a low frequency region rather than a high frequency region.

An object of the present invention is to provide a method and an apparatus for constructing a prediction motion vector list that improves the coding efficiency of inter-picture prediction by using highly correlated information in bi-directional prediction of a current block.

Further, another object of the present invention is to provide a method and a apparatus for constructing a prediction motion vector list capable of increasing coding efficiency according to whether reference pictures for bi-directional prediction of a current block are same or not.

According to an embodiment of the present invention devised for solving the above problems, there is provided a method for decoding a video signal, the method comprising: a step for setting a structure of a coding block constituting a current image; a step for setting a structure of transform blocks corresponding to the coding block; and a step for generating a prediction signal by using the transform blocks, wherein the coding block includes at least one or more blocks of a square block and a non-square block.

The transform block includes any one more block of a square transform block and a non-square transform block of the same size or small size of the coding block.

According to one embodiment of the present invention, the square transform block may be a transform block having a quad-tree structure, and the non-square transform block may be a transform block having a non-square binary tree structure or a non-square quad-tree structure. Further, a step for receiving a piece of transform block division information indicating the shape and size of the transform block may be included.

According to one embodiment of the present invention, the transform block may be divided to include more than any one selected from a non-square transform sub-block and a square transform sub-block, and further comprises a step for subdividing the transform block into sub-transform blocks. When dividing into the sub-transform blocks once again, the prediction signal may be generated for each sub-transform block. In addition, the sub-transform blocks may include more than any one selected from a non-square sub-transform block and a square sub-transform block.

When the current block performs intra-picture prediction, the method of the present invention may further include a step for determining to which region the intra-picture prediction mode of the current block belongs to, among the first mode region having 90° or more and less than 180°, the second mode region having 180° or more and less than 225°, and the third mode region having 45° or more and less than 90°; and a step for variably determining a coding order of the transform block based on a mode region to which the intra-picture prediction mode belongs.

If the direction of the intra-picture prediction mode is the second mode region, the transform block may be coded in order from the lower left direction to the upper right direction, and if the transform block is the square transform block, the transform block may be coded according to an order of the lower left, the lower right, the left upper and the right upper directions. If the transform block is a square transform block, it may be coded according to the order of the lower left, the upper left, the lower right, and the upper right directions.

Further, if the transform block is a divided non-square transform block in a vertical direction, it may be coded in order from left side to right side. If the transform block is a divided non-square transform block in a horizontal direction, it may be coded in order from the bottom to the top.

If the direction of the intra-picture prediction mode is the third region mode, the transform block may be coded in order from the upper right direction to the lower left direction, and if the transform block is the square transform block, the transform block may be coded according to an order of the upper right, the upper left, the lower right, and the lower left directions. If the transform block is a square transform block, it may be coded according to the order of the upper right, the lower right, the upper left, and the lower left directions.

Further, if the transform block is a divided non-square transform block in a vertical direction, it may be coded in order from right side to left side. If the transform block is a horizontally divided non-square transform block, it may be coded in order from the top to the bottom.

According to another embodiment of the present invention devised for solving the above problems, there is provided an apparatus for decoding a video signal, the apparatus comprising: a block setting unit for setting a structure of a coding block constituting a current image, and for setting a structure of transform blocks corresponding to the coding block; and a prediction signal generation unit for generating a prediction signal by using the transform blocks, wherein the coding block and the transform block include at least one or more blocks of a square block and a non-square block, and the prediction signal generation unit may code the transform blocks according to a variable coding order, based the mode region to which the coding block belongs, among the mode regions classified according to the prediction direction of the intra-picture prediction mode of the coding block.

According to one embodiment of the present invention devised for solving the above problems, there is provided a method for decoding a transform block including a scan method for scanning a transform block having a plurality of transform coefficient groups. The scan method comprises a step for obtaining transform region information indicating at least one or more transform regions included in the transform block; a step for setting a plurality of transformation coefficient groups included in the first transform region based on the transform region information; and a step for scanning the plurality of transform coefficient groups included in the second transform region in the transform block.

In connection with the plurality of transformation coefficient groups, the transform coefficient group of the low frequency region may be set prior to the transform coefficient group of the high frequency region.

According to one embodiment of the present invention, the transform region information is received from an encoder or may be obtained from at least one of a sequence parameter set (SPS) and a slice header. Further, the transform region information may be obtained in a predetermined manner in the decoder.

The present method may further include a step for determining whether the transform block is a non-square block or not, prior to the step of obtaining the transform region information. The determining may be performed based on the horizontal length and the vertical length of the transform block.

According to one embodiment of the present invention devised to solve another problems, there is provided an apparatus for decoding a video signal comprising, a transform region information obtaining unit for obtaining transform region information indicating at least one transform region included in a transform block; and a transform coefficient group scan unit that sequentially scans a plurality of transform coefficient groups included in the transform region according to at least one or more transform regions on the basis of the transform region information.

According to one embodiment of the present invention devised to solve another problems, there is provided a method of constructing a prediction motion vector list comprising: a step for obtaining a motion vector for a first direction of a current block; and a step for setting at least one or more prediction motion vector candidates of the second direction constituting a prediction motion vector list in the second direction by using the motion vector for the first direction.

The at least one or more prediction motion vector candidates of the second direction may be set by copying the motion vector for the first direction, and the reference pictures for the first direction and the reference picture for the second direction may have the same picture information. Further, the prediction motion vector candidates of the second direction may be assigned to the index according to the order starting from the smallest code word.

According to one embodiment of the present invention, the prediction motion vector candidate of the second direction may be set by scaling the motion vector for the first direction based on picture information, and the picture information of the reference pictures for the first direction and the reference pictures for the second direction may be different. Also, the prediction motion vector candidates of the second direction may be assigned to the index according to the ascending order starting from the smallest code word.

Prior to the step of setting at least one or more prediction motion vector candidates of the second direction, the step for determining whether or not the picture information of the reference picture for the first direction and the picture information of the reference picture for the second direction are the same or not is further included.

According to one embodiment of the present invention devised to solve the above-mentioned problems, there is provided an apparatus for constructing a prediction motion vector list comprising: a motion vector obtaining unit for obtaining a motion vector for a first direction of a current block; and a second direction prediction motion vector list determining unit for setting at least one or more prediction motion vector candidates of the second direction constituting the prediction motion vector list of the second direction by using the motion vector for the first direction.

The second direction prediction motion vector list determining unit may include a first prediction motion vector candidate determining unit for setting at least one or more prediction motion vector candidates of the second direction by using the motion vector for the first direction; and a second prediction motion vector candidate determining unit for setting at least one or more prediction motion vector candidates of the second direction by using the spatial and temporal neighbor blocks of the current block.

The prediction motion vector candidate of the second direction obtained by the first prediction motion vector candidate determining unit may be set by copying the motion vector for the first direction. The picture information of the reference picture for the first direction and the reference picture for the second direction may be same.

The predicted motion vector candidate of the second direction obtained by the first prediction motion vector candidate determining unit may be set by scaling the motion vector for the first direction on the basis of picture information, the picture information of the reference picture for the first direction, and the picture information of the reference picture for the second direction may be different from each other. In addition, the prediction motion vector candidates of the second direction obtained by the first prediction motion vector candidate determining unit may be assigned to the index in the order having the smallest code word.

According to an embodiment of the present invention, an apparatus for encoding and decoding a video signal which improves coding efficiency by using a non-square coding block and a non-square transform block according to an image is provided.

Further, according to another embodiment of the present invention, a high-resolution image may be encoded and decoded by changing the coding order of the transform block according to the direction of the intra-picture prediction mode of the current block. In addition, it is another object of the present invention to provide a method for determining a coding order of a transform block capable of increasing a coding efficiency, and a method and apparatus for decoding a video signal to perform the coding order.

According to the embodiment of the present invention, when the transform block is a non-square block, the transform block is divided into at least one or more transform regions including a part of the plurality of transform coefficient groups, and the transform coefficient groups included in the transform region are sequentially scanned, so that the coding efficiency of intra-picture prediction may be improved. That is, a method for decoding a video signal which improves the coding efficiency of intra-picture prediction, and an apparatus thereof are provided.

Further, according to another embodiment of the present invention, a decoding method for decoding a video signal, wherein the transform block is divided into at least one or more transform regions, and the transform coefficient groups included in the divided transform region are sequentially scanned so that the transform coefficient group in the low frequency region may first be coded rather than the high frequency region, and thereby coding efficiency may be improved, and an apparatus thereof are provided.

According to an embodiment of the present invention, a method for constructing a predicted motion vector list, wherein a motion vector for a first direction of a current block performing bi-directional prediction is used in setting at least one or more prediction motion vector candidate for a second direction while constructing a prediction motion vector list for a second direction, and thus, the coding efficiency of the inter-picture prediction may be improved due to use of information having a high degree of correlation in inter-picture prediction, and the apparatus thereof are provided.

Further, according to another embodiment of the present invention, a method for constructing a prediction motion vector list, wherein it is determined whether the reference pictures for bi-directional prediction of the current block are same or not, and according to whether the reference pictures are same or not, the motion vector for the first direction in various ways is used as at least one or more prediction motion vector candidates while the prediction motion vector list for a second direction is constructed, and thereby coding efficiency may be provided, and an apparatus thereof are provided.

BRIEF DESCRIPTION OF THE DRAWINGS

FIG. 20 is a diagram illustrating the structure of a general transform block.

FIG. 23A to FIG. 23D are diagrams illustrating a transform coefficient group and the types of a scan method for the transform coefficient group according to a general method.

FIG. 24A and FIG. 24B are diagrams illustrating an example in which a general scan method is applied to a transform block according to an embodiment of the present invention.

FIG. 26 is a flowchart illustrating a method for scanning a transform coefficient group according to an embodiment of the present invention.

FIG. 27 illustrates an apparatus for scanning a group of transform coefficients according to an embodiment of the present invention.

DETAILED DESCRIPTION OF THE INVENTION

Figure 1:
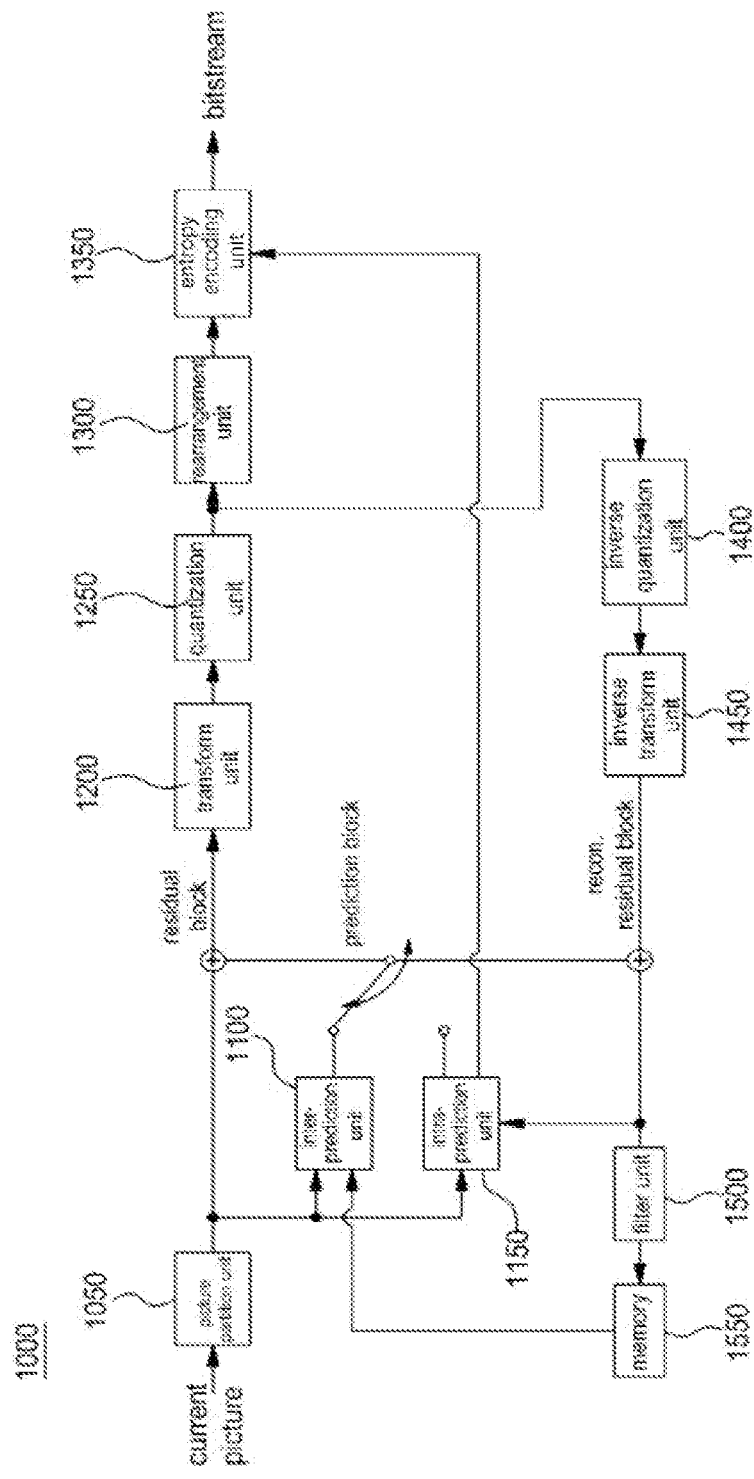
FIG. 1 is a block diagram schematically showing a video encoding apparatus according to an embodiment of the present invention.

Hereinafter, preferred embodiments of the present invention will be described in detail with reference to the accompanying drawings.

The embodiments of the present invention are provided to more fully describe the present invention to those skilled in the art having a common knowledge. The following embodiments may be modified in various forms, and the scope of the present invention is not limited to the following embodiments. Rather, these embodiments are provided so that the present disclosure may be explained more thoroughly and completely, and the concept of the invention may be fully conveyed to those skilled in the art.

Further, in the drawings, the thickness and the size of each unit are exaggerated for convenience and clarity of description, and the same reference numerals denote the same elements in the drawings. As used herein, the term "and/or" includes any and all combinations of one or more items of the listed items.

The terminology used herein is for the purpose of describing particular embodiments only and is not intended to be limiting the invention. As used herein, the singular forms "a", "an" and "the" may include plural referents unless the context clearly dictates otherwise. Also, the terms, "comprise" and/or "comprising" when used in this specification are employed to specify the stated forms, numbers, steps, operations, elements, components and/and presence of the above item group, and does not preclude the addition of one or more other forms numbers, steps, operations, elements, components and/or presence of the above item group.

Although the terms, first, second, and etc. are used herein to describe various elements, members, parts, regions, and/or portions. In the present specification, it is very apparent that the present invention should not be limited to the elements, members, parts, regions, and/or portions. These terms are only used to distinguish one element, member, component, region, or portion from another region or portion. Thus, a first element, member, component, region, or portion described below may refer to a second element, member, component, region, or portion without departing from the teachings of the present invention. Furthermore, the term, "and/or" include any combination of a plurality of related items as described above, or any item of a plurality of related items as described above.

It is to be understood that when an element is referred to as being "connected" or "coupled" to another element, it is to be understood that not only the element is directly connected or coupled to the other element, but also the case where another element is arranged between the above-described element and the other element is included. However, when an element is referred to as being "directly connected" or "directly coupled" to another element, it should be understood that there is no other element between them and the element and the other element are directly connected or coupled.

Hereinafter, the embodiments of the present invention will be described with reference to the drawings schematically showing ideal embodiments of the present invention. In the drawings, for example, the size and shape of members may be exaggerated for convenience and clarity of illustration, and in actual implementation, variations of the illustrated shape may be expected. Accordingly, the embodiments of the present invention should not be construed as being limited to the specific shapes of the range shown herein.

FIG. 1 is a block diagram schematically showing an image encoding apparatus according to an embodiment of the present invention.

Referring FIG. 1, the image encoding apparatus 1000 includes a picture partition unit 1050, an inter-picture prediction unit 1100, an intra-prediction unit 1150, a transform unit 1200, a quantization unit 1250, a rearrangement unit 1300, an entropy encoding unit 1350, a dequantization unit 1400, an inverse transform unit 1450, a filter unit 1500, and a memory 1550.

Each configuring component shown in FIG. 1 is shown independently to represent different characteristic functions in the image encoding apparatus, and this drawing does not mean that each configuring component is composed of a separate hardware or one software configuration unit.

That is, each configuring component is enumerated as each constituent element for convenience of description, and at least two constituent elements of each constituent element are combined to form one constituent element, or one constituent element is divided into a plurality of constituent elements for fulfilling the functions of the present invention. It is to be understood that either the embodiments in which each of these configuring elements according to even the integrated or the separate embodiments may be included in the scope of the present invention without departing from the essential aspects of the present invention.

The picture partition unit 1050 may divide the inputted picture into at least one processing unit. The processing unit may be a Prediction Unit (hereinafter, "PU"), a Transform Unit (hereinafter, "TU"), or a Coding Unit (hereinafter, "CU"). However, for the sake of convenience of explanation, the prediction block may be expressed as a prediction unit, the transform block may be expressed as a transform unit, and the encoding or decoding block may be expressed as a coding unit or a decoding unit.

According to an embodiment of the present invention, the picture partition unit 1050 divides a picture into a combination of a plurality of encoding blocks, a prediction block, and a transform block, and it is possible to encode a picture by selecting a combination of an encoding block, a prediction block, and a transform block based on a predetermined criterion (for example, a cost function).

For example, one picture may be divided into a plurality of coding blocks. According to an embodiment of the present invention, one picture may partition the coding block using a recursive tree structure such as a quad tree structure or a binary tree structure. A coding block, which is divided into other coding blocks with one picture or a largest coding unit as a root, may be divided with child nodes as many as the number of the divided coding blocks. In this process, the coding block which is not further divided may be a leaf node. For example, in a case where it is assumed that only a square block division is possible for one coding block, one coding block may be divided into four coding blocks, for example.

However, according to the present invention, the coding block, the prediction block, and/or the transform block are not limited to the symmetric partition in a division step, but the asymmetric division is also possible. Not only 4 partitions but also 2 partitions are possible. However, this number of divisions is only exemplary and the present invention is not limited thereto. In this way, a method and apparatus for encoding and decoding a video signal using a non-square block that is asymmetrically divided into a coding block and a transform block will be described with reference to FIGS. 3 to 19C.

The prediction block may also be divided into at least one square or non-square shape of the same size in one coding block, and any one of the divided prediction blocks in one coding block. One prediction block may be divided so as to have a shape and a size which are different from those of the other prediction block. In an embodiment, the coding block and prediction block are same, and all coding block is used for prediction as the prediction block. That is, the prediction may also be performed based on the divided coding blocks without distinguishing between the coding blocks and the prediction blocks.

The prediction unit may include an inter-picture prediction unit 1100 for performing inter-prediction and an intra-picture prediction unit 1150 for performing intra-prediction. In order to enhance the coding efficiency, instead of coding the video signal as it is, a video is predicted using a specific region of an inner side of the previously completed coded and decoded picture, and the residual between the original image and the predicted image. In addition, the prediction mode information, motion vector information, and the like used for prediction may be encoded by the entropy encoding unit 1350 together with the residual value, and may be transmitted to the decoding unit. When a particular encoding mode is used, it is also possible to encode the original block as it is without generating a prediction block through the prediction units 1100 and 1150, and transmit it to the decoding unit.

According to an embodiment of the present invention, the prediction units 1100 and 1150 may determine whether inter-picture prediction or intra-picture prediction is performed or not with respect to the prediction block, and determine whether specific information according to each of the prediction methods such as the intra-picture prediction mode, the motion vector, and the reference picture may be determined. In this case, the processing unit in which the prediction is performed, the prediction method, and the detail processing unit may be different from each other. For example, even if the prediction mode and the prediction method are determined according to the prediction block, but a prediction may be performed according to the transform block.

The prediction units 1100 and 1150 may generate prediction blocks composed of predicted samples by performing prediction on the processing units of pictures divided by the picture partition unit 1050. The picture processing unit in the prediction units 1100 and 1150 may be a coding block unit, a transform block unit, or a prediction block unit.

The inter-picture prediction unit 1100 may predict a prediction block based on information of at least one of a previous picture or a following picture of the current picture and the prediction block may be predicted based on the information of the partially coded region in the current picture in some cases. The inter-picture prediction unit 1100 may include a reference picture interpolation unit, a motion prediction unit, and a motion compensation unit.

According to an embodiment of the present invention, the information of the one or more pictures used for prediction in the inter-picture prediction unit 1100 may be information of already coded and decoded pictures, or it may be the information of the modified and stored pictures according to some arbitrary methods. For example, the picture modified and stored by any of the above arbitrary methods may be a picture obtained by enlarging or reducing a picture on which coding and decoding has been performed, or may be a picture acquired by changing the brightness of all pixel values in a picture, or by modifying a color format.

The reference picture interpolation unit may generate the pixel information having integer pixels or less from the reference picture when receiving the reference picture information from the memory 1550. In the case of a luma pixel, pixel information of less than or equal to an integer may be generated in units of ¼ pixel by using a DCT-based 8-tap interpolation filter with different coefficients of the filter. In the case of a chroma pixel, pixel information of less than or equal to an integer may be generated in units of ⅛ pixel by using a DCT-based 4-tap interpolation filter having different coefficients of a filter. However, the unit for generating the pixel information of the type of the filter and a piece of pixel information of less than or equal to an integer is not limited to thereof, and a unit for generating pixel information equal or less than an integer using various interpolation filters may be determined.

The motion prediction unit may perform motion prediction based on the reference pictures interpolated by the reference picture interpolation unit. Various methods may be used to calculate the motion vector. The motion vector may have a motion vector value of an integer pixel unit or a motion vector value of ¼ or ⅛ pixel unit based on the interpolated pixel. According to an embodiment of the present invention, the prediction unit of the current block may be predicted by differentiating the motion prediction method in the motion prediction unit. The motion prediction method may be a variety of methods including a merge method, an AMVP (Advanced Motion Vector Prediction) method, and a skip method. In this way, the information including the index of the reference picture, the motion vector prediction (MVP), and the residual signal selected in the inter-picture prediction unit 1100 may be entropy coded and transmitted to the decoder.

Unlike the inter-picture prediction, the intra-picture prediction unit 1150 may generate a prediction block based on reference pixel information around the current block, which is pixel information in the current picture. In the case where the neighboring blocks of the prediction block are blocks in which the inter-picture prediction is performed, that is, in a case where the reference pixels are pixels subjected to inter-picture prediction, the reference pixels included in the block in which the inter-picture prediction has been performed may be replaced with the reference pixel information of a block subject to the neighboring intra-picture prediction.

If the reference pixel is unavailable, a setting step should be preceded to make it available. Generally, in such a case, the non-available reference pixel has been used by replacing it with at least one reference pixel among available neighboring pixels or assigning a predetermined sample value.

However, a method of copying and using the reference pixels available for such unavailable reference pixels may cause a problem such as lowering the intra-picture prediction coding efficiency in decoding the current image. According to various embodiments of the present invention, in order to solve this problem, it is possible to perform intra-picture prediction using an available reference pixel region rather than a reference pixel region which is not available in the coding of the transform block. For this purpose, the coding order of the transform blocks may be changed in various ways according to the direction of the intra-picture prediction mode. A detailed description thereof will be described later.

In addition, the intra-picture prediction unit 1150 may use the most probable mode (MPM) obtained from the neighboring blocks to encode the intra-picture prediction mode. According to various embodiments of the present invention, the most probable mode list (MPM List), which is constructed with the most probable intra-picture prediction modes, may be constructed in various ways.

Even when the intra-picture prediction unit 1150 performs intra-picture prediction, the processing unit in which the prediction is performed, the prediction method, and the processing unit in which the concrete contents are determined may be different from each other. For example, when the prediction mode may be defined as a prediction unit (PU), the prediction may be performed in the prediction unit, the prediction mode may be defined as a prediction unit, and the prediction may be performed in a transform unit (TU). According to an embodiment of the present invention, the prediction mode may be determined as units of coding blocks (CU), and the prediction may be performed in units of the coding blocks because the coding unit and the prediction unit are the same.

The prediction mode of the intra-prediction may include 65 directional prediction modes and at least more than two non-directional modes. The non-directional mode may include a DC prediction mode and a planar mode. The number of the 67 inter-picture prediction modes is only an example, and the present invention is not limited thereto, and intra-prediction may be performed in a more directional or non-directional mode in order to predict in various ways.

According to an embodiment of the present invention, intra-prediction may generate a prediction block after applying a filter to a reference pixel. In this case, whether to apply the filter to the reference pixel may be determined according to the intra-picture prediction mode and/or the size of the current block.

The prediction unit (PU) may be determined in various sizes and forms based upon coding unit (CU) which is no longer divided. For example, in case of inter-picture prediction, the prediction unit may have the same size as 2N×2N, 2N×N, N×2N or N×N. In the case of the intra-prediction, the prediction unit may have the same size as 2N×2N or N×N (N is an integer), but the intra-picture prediction may be performed even as a shape of a non-square size as well as a shape of a square size. In this case, the N×N size prediction unit may be set to be applied only in a specific case. Further, an intra-prediction unit having the same size as N×mN, mN×N, 2N×mN or mN×2N (m is a fraction or an integer) may be further defined and used in addition to the prediction unit of the above-described size.

A residual value (a residual block or a residual signal) between the prediction block generated in the intra-picture prediction unit 1150 and the original block may be inputted to the transform unit 1200. In addition, the prediction mode information, the interpolation filter information, and the like used for prediction may be encoded by the entropy encoding unit 1350 together with the residual value, and then transmitted to the decoder.

The transforming unit 1200 may transform a residual block including residual values of the prediction unit generated through the prediction units 1100 and 1150 by using the transform methods such as a discrete cosine transform (DCT), a discrete sine transform (DST), and KLT (Karhunen Loeve Transform). The step for determining whether the DCT, DST, or KLT method is applied to transform the residual block may be determined based on the intra-picture prediction mode information of the prediction unit used to generate the residual block.

The transform block in transform unit 1200 may be a TU and may be a square, a non-square, a square quad tree structure, a non-square quad tree structure or a binary tree structure. According to an embodiment of the present invention, the size of the transform unit may be determined within a range of predetermined maximum and minimum sizes. In addition, one transform block may be further divided into sub transform blocks, which may be a square structure, a non-square structure, a square quad tree structure, a non-square quad tree structure, or a binary tree structure.

The quantization unit 1250 may quantize the residual values transformed by the transform unit 1200 to generate a quantization coefficient. According to an embodiment of the present invention, the transformed residual values may be value transformed into a frequency region. The quantization coefficient may be changed according to the transform unit or the importance of the image, and the value calculated by the quantization unit 1250 may be provided to the dequantization unit 1400 and the rearrangement unit 1300.

The rearrangement unit 1300 may rearrange the quantization coefficients provided from the quantization unit 1250. The rearrangement unit 1300 may improve the coding efficiency in the entropy encoding unit 1350 by rearranging the quantization coefficients. The rearrangement unit 1300 may rearrange the quantization coefficients of the two-dimensional block form into a one-dimensional vector form through a coefficient scan method. In the coefficient scan method, it is possible to determine which scan method is used according to the size of the transform unit and the intra-picture prediction mode. The coefficient scan method may include a jig-zag scan, a vertical scan method that scans coefficients of a two-dimensional block type in a column direction, and a horizontal scan method that scans coefficients of a two-dimensional block type in a row direction. According to an embodiment of the present invention, the rearrangement unit 1300 may increase the entropy encoding efficiency in the entropy encoding unit 1350 by changing the order of the coefficient scanning based on the probabilistic statistics of the coefficients transmitted from the quantization unit.

The entropy encoding unit 1350 may perform entropy encoding on the quantized coefficients rearranged by the rearrangement unit 1300. For entropy encoding, various encoding methods such as Exponential Golomb, Context-Adaptive Variable Length Coding (CAVLC), and Content-Adaptive Binary Arithmetic Coding (CABAC) may be used.

The entropy encoding unit 1350 encodes various information such as quantization coefficient information, block type information, prediction mode information, division unit information, prediction unit information, and transmission unit information, motion vector information, reference picture information, interpolation information of a block, and filtering information of the coding unit received from the rearrangement unit 1300 and the prediction units 1100 and 1150. Further, according to an embodiment of the present invention, the entropy encoding unit 1350 may make a certain change to the parameter set or syntax to be transmitted, if necessary.

The dequantization unit 1400 dequantizes the quantized values in the quantization unit 1250 and the inverse transform unit 1450 inversely changes the dequantized values in the dequantization unit 1400. The residual value generated by the dequantization unit 1400 and the inverse transformation unit 1450 may be combined with the prediction block predicted by the prediction units 1100 and 1150 to generate a reconstructed block. The image composed of the generated restoration blocks may be a motion compensation image or an MC image (Motion Compensated Picture).

The motion compensation image may be input to the filter unit 1500. The filter unit 1500 may include a deblocking filter unit, a sample adaptive offset (SAO) unit, and an adaptive loop filter unit (ALF). In summary, the motion compensation image may be input to an offset correction unit to correct an offset after a deblocking filter is applied in the deblocking filter unit to reduce or remove blocking artifacts. The picture output from the offset correction unit is input to the adaptive loop filter unit, passes through an ALF (Adaptive Loop Filter) filter, and the picture passed through the filter may be transmitted to the memory 1550.

To describe the filter unit 1500 in detail, the deblocking filter unit may remove distortion in a block generated at a boundary between blocks in a reconstructed picture. In order to determine whether to perform deblocking, it may be determined whether to apply a deblocking filter to a current block based on pixels included in a few columns or rows included in the block. When a deblocking filter is applied to a block, a strong filter or a weak filter may be applied according to the required deblocking filtering strength. Further, in applying the deblocking filter, horizontal filtering and vertical filtering may be performed concurrently in performing vertical filtering and horizontal filtering.

The offset correction unit may correct the offset from the original image on a pixel-by-pixel basis with respect to the residual block to which the deblocking filter is applied. In order to correct an offset for a specific picture, a method (Band Offset) comprising the steps for dividing a pixel included in an image into a predetermined number of regions, determining an region to perform an offset, and applying an offset to the region, or a method (Edge Offset) for applying an offset in consideration of edge information of each pixel may be applied. However, according to an embodiment of the present invention, filtering may not be applied to the filter unit 1500 for the restoration block used in inter-picture prediction.

The adaptive loop filter (ALF) may be performed only when high efficiency is applied based on a value obtained by comparing the filtered reconstructed image with the original image. After partitioning the pixels included in the image into predetermined groups, one filter to be applied to the concerning group may be determined and different filtering may be performed for each group. In connection with information related to whether or not to apply the ALF, The luma signal may be transmitted for each coding unit (CU), and the shape and the filter coefficient of the ALF filter to be applied may be changed according to each block. In addition, ALF filters of the same type (fixed form) may be applied regardless of the characteristics of the applied target block.

The memory 1550 may store the restored block or picture calculated through the filter unit 1500. The restored block or the picture stored in the memory 1550 may be provided to the inter-picture prediction unit 1100 performing inter-picture prediction or the intra-picture prediction unit 1150. The pixel values of the reconstruction blocks used in the intra-picture prediction unit 1150 may be data to which the deblocking filter unit, the offset correction unit, and the adaptive loop filter unit are not applied.

Figure 2:
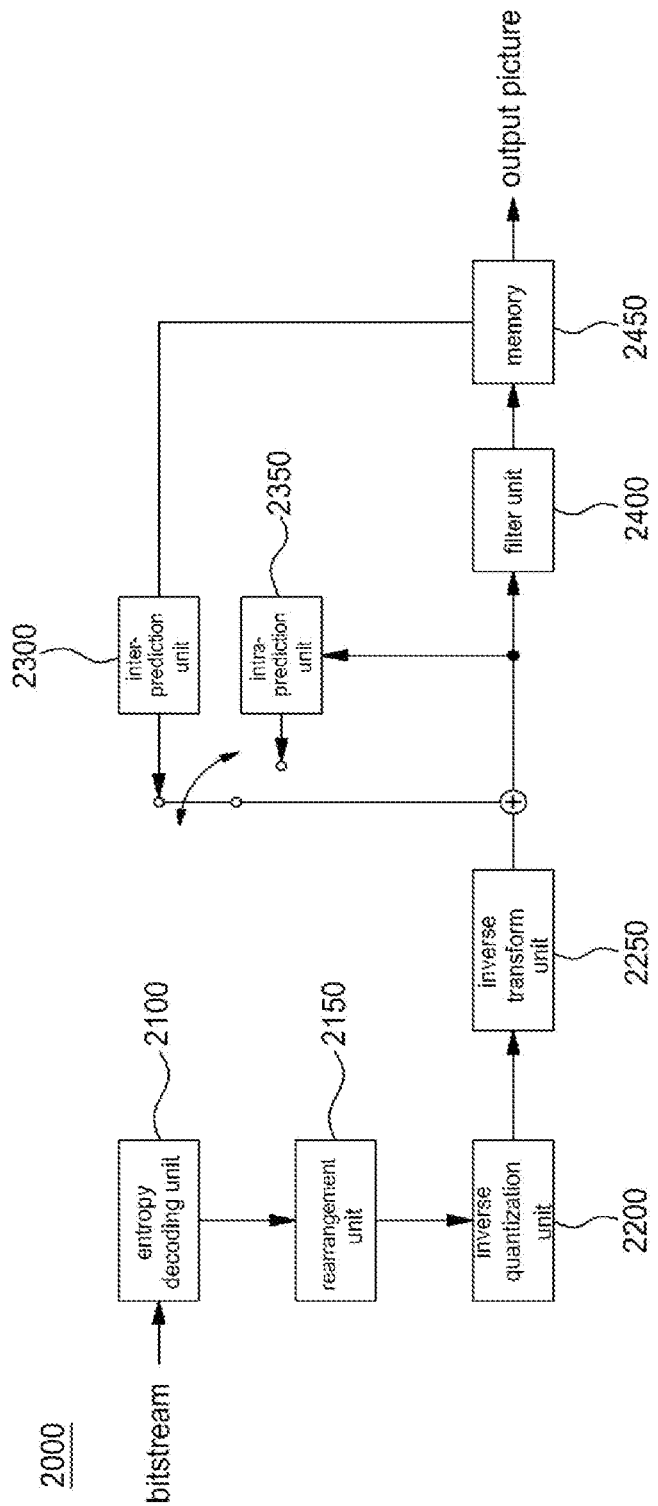
FIG. 2 is a block diagram schematically showing a video decoding apparatus according to an embodiment of the present invention.

FIG. 2 is a block diagram schematically illustrating an image decoding apparatus according to an embodiment of the present invention. Referring to FIG. 2, an image decoding apparatus 2000 includes an entropy decoding unit 2100, a rearrangement unit 2150, a dequantization unit 2200, an inverse transform unit 2250, an inter-picture prediction unit 2300, an intra-picture prediction unit 2350, a filter unit 2400, and a memory 2450.

When an image bit stream is input from the image encoding apparatus, the input bit stream may be decoded through an inverse process of a procedure in which image information is processed in the encoding apparatus. For example, when variable length coding (VLC) such as CAVLC is used to perform entropy coding in an image coding apparatus, the entropy decoding unit 2100 may also perform entropy decoding by implementing the same VLC table as the VLC table used in the encoding apparatus. Further, when CABAC is used to perform entropy encoding in the encoding apparatus, the entropy decoding unit 2100 may perform entropy decoding using CABAC in response to the above state.

The entropy decoding unit 2100 provides the information for generating a prediction block among the decoded information to the inter-picture prediction unit 2300 and the intra-picture prediction unit 2350. The residual value processed entropy decoding in the entropy decoding unit 2100 may be input to the rearrangement unit 2150.

The rearrangement unit 2150 may rearrange the entropy-decoded bit stream in the entropy decoding unit 2100 based on a method of re-arranging the entropy-decoded bit stream in the image encoder. The rearrangement unit 2150 may perform rearrangement according to a method comprising the steps for receiving information related to the coefficient scanning performed by the encoder, and performing a reverse scanning based on the scanning order performed by the encoder.

The dequantization 2200 may perform a dequantization process based on the quantization parameters provided by the encoding apparatus, and the coefficient values of the re-arranged blocks. The transform unit 2250 may perform an inverse DCT, an inverse DST, or an inverse KLT on the quantization result performed by the image coding apparatus with respect to the DCT, DST, or KLT performed by the transform unit of the encoding apparatus. The inverse transform may be performed based on the transmission unit determined by the encoding apparatus or the division unit of the image. The transforming unit of the encoding apparatus may selectively perform DCT, DST, or KLT according to the prediction method, and information such as the size and prediction direction of the current block, and in the inverse transform unit 2250 of the decoding apparatus, the inverse transform method is determined based on the transform information performed by the transform unit of the encoding apparatus and thereby, the inverse transform may be performed.

The prediction units 2300 and 2350 may generate a prediction block based on the information related to the prediction block generation provided by the entropy decoding unit 2100 and the previously decoded block and/or picture information provided in the memory 2450. The reconstruction block may be generated using the prediction block generated by the prediction units 2300 and 2350 and the residual block provided by the inverse transform unit 2250. The concrete prediction method performed by the prediction units 2300 and 2350 may be the same as the prediction method performed by the prediction units 1100 and 1150 of the encoding apparatus.

The prediction units 2300 and 2350 may include a prediction unit determination unit (not shown), an inter-picture prediction unit 2300, and an intra-prediction unit 2350. The prediction unit determination unit receives various information such as prediction unit information input from the entropy decoding unit 2100, a piece of prediction mode information of the intra-prediction method, a piece of motion prediction related information of the inter-picture prediction method, distinguish the prediction blocks in the current coding block, and discriminate whether the prediction block performs inter-picture prediction or intra-picture prediction.

The inter-picture prediction unit 2300 uses information necessary for inter-picture prediction of the current prediction block provided by the image encoder so that an inter-picture prediction for the current prediction block may be performed based on information included in at least any one of a previous picture or a following picture of a current picture in which the current prediction block is included.

Specifically, in the inter-picture prediction, a reference block for a current block is selected and a reference block having the same size as the current block is selected to generate a prediction block for the current block. At this time, information of neighboring blocks of the current picture may be used to use the information of the reference picture. For example, a prediction block for a current block may be generated based on information of neighboring blocks by using a method such as a skip mode, a merge mode, and AMVP (Advanced Motion Vector Prediction).

The prediction block may be generated in unit of a sample less than or equal to integer, such as ½ pixel sample unit and ¼ pixel sample unit. In this case, the motion vector may also be expressed in unit of less than or equal to integer pixel or less. For example, it may be expressed in units of ¼ pixel for luminance pixels and ⅛ pixels for chrominance pixels.

The motion information including the motion vector and the reference picture index necessary for inter-picture prediction of the current block may be derived in response to a result acquired by confirming the skip flag, merge flag, and the like received from the encoding apparatus.

The intra-prediction unit 2350 may generate a prediction block based on the pixel information in the current picture. If the prediction unit is a prediction unit that performs intra-prediction, the intra-prediction may be performed based on the intra-prediction mode information of the prediction unit provided by the image encoder. In the case where the neighboring blocks of the prediction unit are the blocks in which the inter-picture prediction is performed, that is, when the reference pixels are the pixels performing the inter-picture prediction, the reference pixels included in the block for which the inter-picture prediction has been performed may be replaced with the reference pixel information of a block for which the neighboring intra-picture prediction is performed.

If the reference pixel is unavailable, it must be set to be available in advance. Generally, in such a case, the non-available reference pixel has been used by replacing it with at least one reference pixel among available neighboring pixel values or assigning a predetermined sample value.

However, a method of copying and using the reference pixels available for such unavailable reference pixels may cause a problem of lowering the intra-picture prediction coding efficiency in decoding the current image. According to various embodiments of the present invention in order to solve this problem, the coding order of the transform blocks may be changed in various ways according to the direction of the intra-prediction mode so that intra-prediction may be performed using available reference pixel regions rather than non-available reference pixel regions in coding the transform block. A detailed description related to this content will be explained later.

In addition, the intra-prediction unit 2350 may use the most probable intra-prediction mode (MPM) obtained from the neighboring blocks to encode the intra-prediction mode. According to an embodiment of the present invention, the most probable intra-picture prediction mode may use an intra-picture prediction mode of a spatially neighboring block of the current block.

According to an embodiment of the present invention, in the intra-prediction unit 2350, the processing unit in which the prediction is performed may be different from the processing unit in which the prediction method and the specific contents are determined. For example, when the prediction mode may be determined as a prediction unit, the prediction may be performed in a prediction unit. Further, the prediction mode may be defined as a prediction unit and then, the intra-prediction may be performed in the transform unit.

In this case, the prediction block (PU) may be determined as formats having various sizes and shapes from a coding block (CU) which is not further divided. For example, in the case of the intra-picture prediction, the prediction block may have the sizes as 2N×2N or N×N (N is an integer), but the intra-picture prediction may be performed by using the prediction blocks having the sizes such as the N×mN, mN×N, 2N×mN or mN×2N (m is a fraction or an integer). In this case, the prediction unit of the N×N may be set to be applied only in a specific case.

Further, the transform block TU may also be determined as formats having various sizes and shapes. For example, the transform block may have the sizes as 2N×2N or N×N (where N is an integer), but the intra-picture prediction may be performed by using a transform blocks having the sizes such as N×mN, mN×N, 2N×mN or mN×2N (m is a fraction or an integer). In this case, a prediction unit of the N×N size may be set to be applied only in a specific case. According to an embodiment of the present invention, the transform block may be any one selected from the blocks having a square structure, a non-square structure, a square quad tree structure, a non-square quad tree structure, or a binary tree structure. According to an embodiment of the present invention, the size of the transform block may be determined within a range of predetermined maximum and minimum sizes. In addition, one transform block may be divided into sub-transform blocks. In this case, the sub-transform blocks may also be divided into a square structure, a non-square structure, a square quad tree structure, a non-square quad tree structure, or a binary tree structure.

The intra-picture prediction unit 2350 may include an AIS (Adaptive Intra Smoothing) filter unit, a reference pixel interpolation unit, and a DC filter unit. The AIS filter unit performs filtering on the reference pixels of the current block and determines whether to apply the filter according to the prediction mode of the current prediction unit. The AIS filtering may be performed on the reference pixels of the current block by using the prediction mode of the prediction unit provided in the image encoder and the AIS filter information. If the prediction mode of the current block is a mode for which AIS filtering is not performed, the AIS filter unit may not be applied to the current block.

The reference pixel interpolation unit may interpolate the reference pixel to generate a reference pixel in the pixel unit less than an integer value when the prediction mode of the prediction unit is a prediction unit for performing intra-picture prediction based on the sample value obtained by interpolating the reference pixel have. If the prediction mode of the current prediction unit does not interpolate the reference pixel and generates a prediction block, the reference pixel may not be interpolated. The DC filter unit may generate a prediction block through filtering when the prediction mode of the current block is the DC mode.

The reconstructed block and/or the reconstructed picture may be provided to the filter unit 2400. The filter unit 2400 may include a deblocking filter unit, an adaptive offset, and/or an adaptive loop filter unit in the reconstructed block and/or the reconstructed the picture. The deblocking filter unit may receive information indicating whether a deblocking filter is applied to a corresponding block or a picture from the image encoder or not, and information indicating whether a strong or weak filter is applied or not when a deblocking filter is applied. The deblocking filter unit may receive the information concerning deblocking filter which is provided by the image encoder and may perform a deblocking filtering process on the corresponding block in the image decoder.

The offset correction unit may perform offset correction on the reconstructed image based on the type of offset correction applied to the image, and the offset value information during encoding. The adaptive loop filter unit may be applied as a coding unit based on information such as information on whether the adaptive loop filter provided from the encoder is applied or not, and the coefficient information of the adaptive loop filter. The information associated with the adaptive loop filter may be provided in a specific parameter set.

The memory 2450 may store the reconstructed picture or block, use the reconstructed picture as a reference picture or reference block later, and may also provide the reconstructed picture to the output unit.

Although omitted herein for the sake of convenience, the bit stream input to the decoding apparatus may be input to an entropy decoding unit through a parsing step. In addition, the entropy decoding unit may perform a parsing process.

In this specification, coding may be interpreted as encoding or decoding in some cases, and information may be construed as including all of values, parameters, coefficients, elements, flags, and the like. A 'screen' or a 'picture' generally means a unit representing one image of a specific time zone. A 'slice', a 'frame', or the like refers to a unit constituting a part of a picture in the coding of an actual video signal and may be used in combination with a picture as needed.

'Pixel' or 'pel' represents the smallest unit of a single image. Also, as a term indicating the value of a specific pixel, 'sample' may be used. The sample may be divided into luma and chroma components, but generally it may be used as a term including all of them. The chroma component represents a difference between predetermined colors, and is generally composed of Cb and Cr.

The term 'unit' refers to a basic unit of an image processing unit or a specific position of an image, such as the encoding unit, the prediction unit, and the transform unit described above. In some cases, the "unit" may be used in combination with terms such as 'block' or 'region'. The block may also be used as a term indicating a set of samples consisting of M rows and N rows, or a set of transform coefficients.

Figure 3:
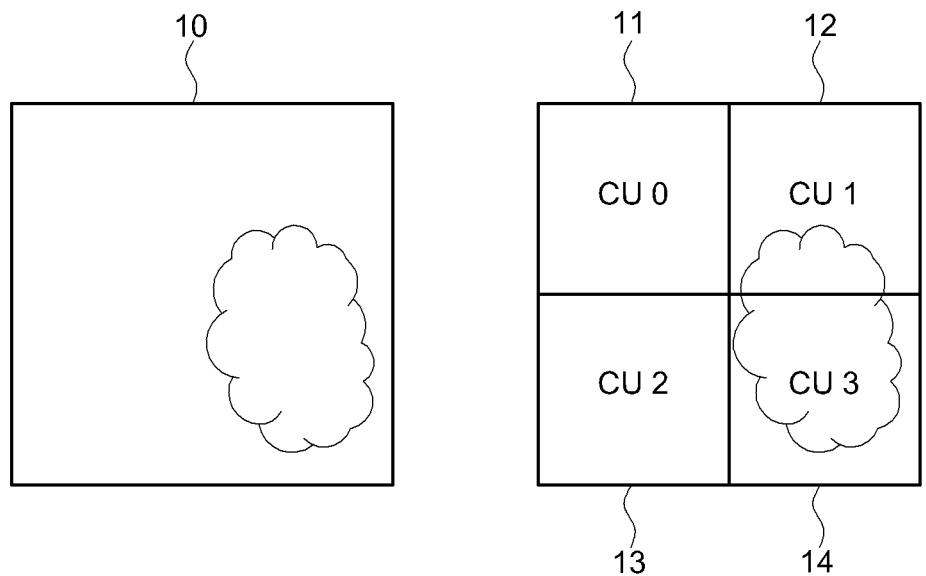
FIG. 3 is a diagram illustrating a coding block of a current block according to a general method.

FIG. 3 illustrates a coding block for a current block according to the prior art.

Referring to FIG. 3, an image corresponding to the current block 10 may be encoded or decoded using square coding blocks 11, 12, 13, and 14 of the same size. For example, even when the image of the current block 10 is shifted to one side in the current block and located only in the CU1 (12) and the CU3 (14) among the square coding blocks, CU0 (11) and CU2 (13), that is, the coding blocks which are divided into four square blocks and do not have the actual image, are also to be encoded or decoded. Thus, the prediction mode and prediction information for CU0 (11) and CU2 (13) should also be transmitted.

In such a method, since there are many pieces of information to be transmitted regardless of the features of the image of the concerned block, the coding efficiency may be lowered. In order to solve this problem, the coding block according to an embodiment of the present invention may include not only a square coding block but also a non-square coding block.

Figure 4A:
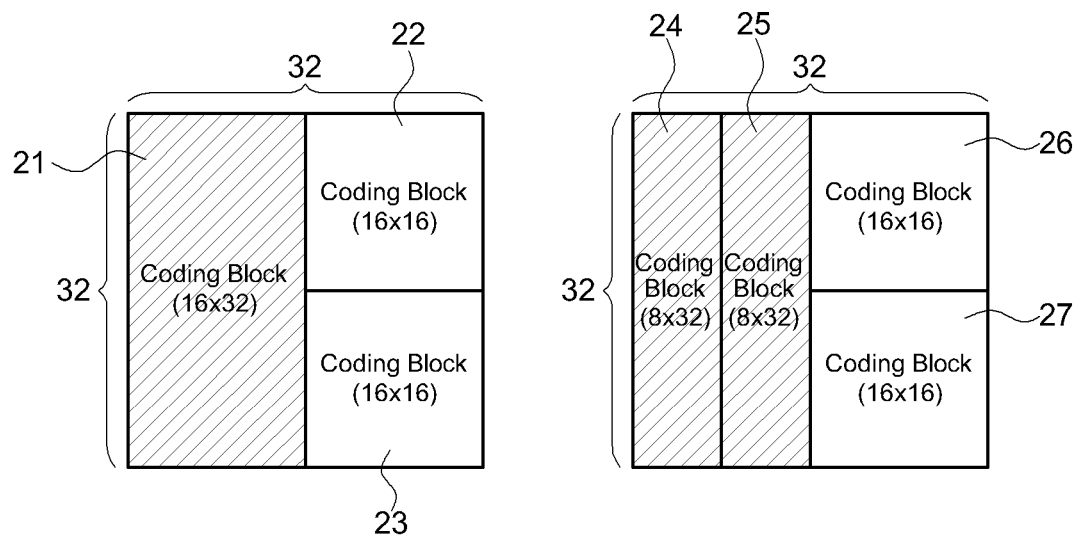
FIG. 4A to 4C are diagrams illustrating examples of non-square coding blocks of a current block according to an embodiment of the present invention.
Figure 4B:
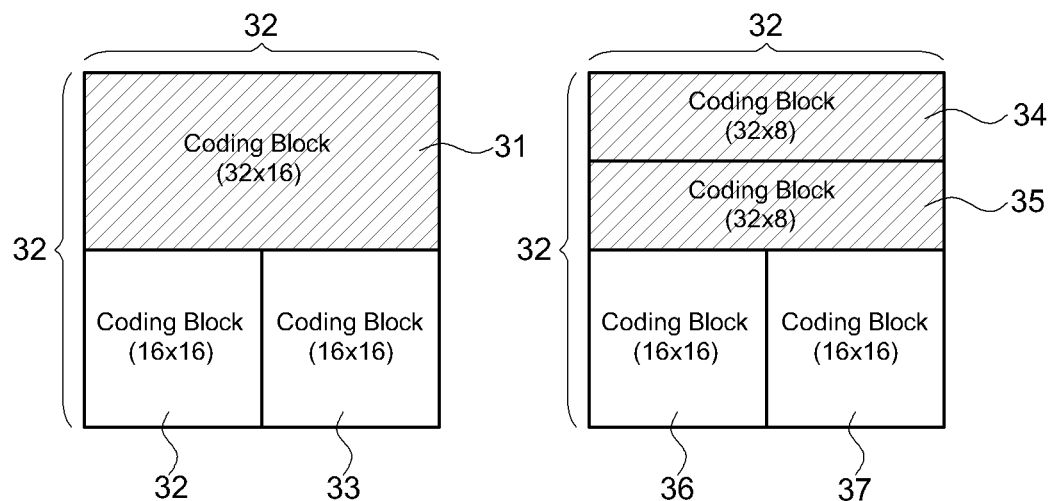
Figure 4C:
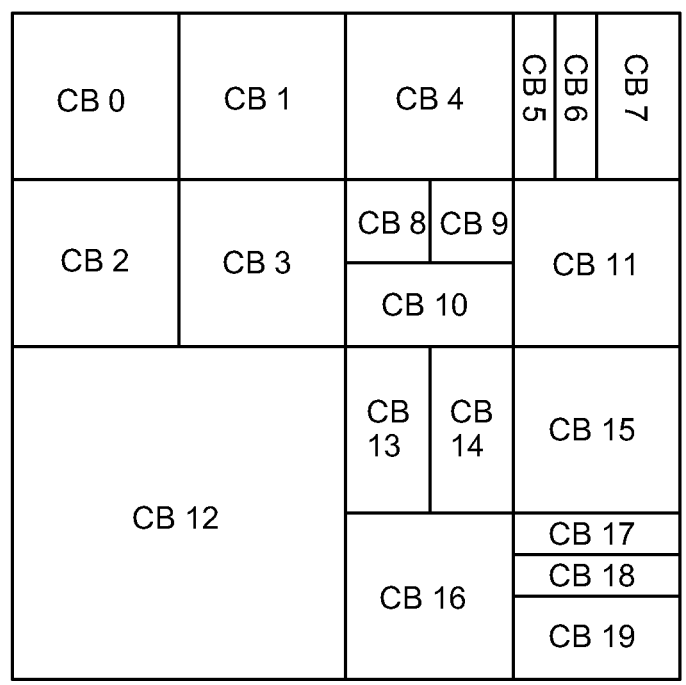

FIG. 4A to 4C illustrate examples of non-square coding blocks of a current block according to an embodiment of the present invention.

As shown in FIG. 4A to FIG. 4C, the coding block may include non-square coding blocks. In addition, the prediction mode and the prediction information may be independently determined and transmitted for each coding block. According to an embodiment of the present invention, the non-square coding block may include a longitudinal non-square coding block having a longer length in the longitudinal direction as compared with the horizontal direction, and a horizontal non-square coding block having a longer length in the horizontal direction as compared with the longitudinal direction.

First of all, referring to FIG. 4A, the coding blocks 21 to 27 for coding a current block represent an example including coding blocks 21, 24 and 25 of non-square shape in the longitudinal direction. For example, the non-square coding blocks in the longitudinal direction may have a size of 16×32 (21) or a size of 8×32 (24, 25), but the ratio of the horizontal and longitudinal sizes of the coding block is not limited in the present invention. According to an embodiment of the present invention, the non-square shaped coding blocks in the longitudinal direction may be used when the image corresponding to the current block is largely changed in the longitudinal direction as compared with the horizontal direction.

Further, referring to FIG. 4B, the coding blocks 31 to 37 for coding the current block represent an example including the non-square shaped coding blocks 31, 34 and 35 in the horizontal direction. For example, the non-square coding blocks in the horizontal direction may have a size of 32×16 (31) or 32×8 (34, 35), but the ratio of the horizontal and longitudinal sizes of the coding block is not limited. According to an embodiment of the present invention, the non-square shaped coding blocks in the horizontal direction may be used when the image corresponding to the current block is largely changed in the horizontal direction as compared with the longitudinal direction. However, this is merely an example, and a method for determining whether or not to use non-square coding blocks for a current block is not limited in the present invention, and the maximum and minimum sizes of non-square coding blocks are also not limited. Also, the number of non-square coding blocks and the ratio of the horizontal length to the longitudinal length are not limited, and the current block may also be divided into 1:N.

According to an embodiment of the present invention, the current coding block CU may be used as a prediction block PU as it is, without separately setting a prediction block PU corresponding to the current coding block CU. In this case, the coding block CU may be a non-square block as well as a square block like a general method, and a current block including the coding blocks CU may have a 1:N division structure. Also, in another embodiment, the current coding block CU may be used equally in both the prediction block PU and the transform block TU, in which case the current block containing the current coding block may be divided using a structure divided into square blocks, a structure divided into non-square blocks, and a structure divided into 1:N.

Referring to FIG. 4C, a coding tree unit CTU includes square coding blocks CB0 to CB4, CB8, CB9, CB11, CB12 and CB15 of various sizes and non-square coding blocks CB5 to CB7, CB10, CB13, CB14, CB17 to CB19) of various sizes. As described above, when coding the current block using the square coding block as well as the non-square coding block, it is possible to improve the coding efficiency by reducing the transmission of the unnecessary prediction mode and the prediction information.

In the conventional coding of a video signal, only a square block is used as a coding block, and only a square transform block is also used as a transform block. The transform blocks based on the size of each coding block or prediction block may be subdivided into a quad tree partition structure. For example, when one transform block is divided into a quad tree structure, the transform block may be divided into four square sub-blocks. In the conventional coding method using only the square transform blocks, it is difficult to consider characteristics of an image corresponding to a coding block and characteristics of a residual signal generated according to a prediction mode. Therefore, the coding method of a video signal according to an embodiment of the present invention may use a non-square transform block and a non-square sub-transform block as a transform block, as well as a non-square coding block.

Figure 5A:
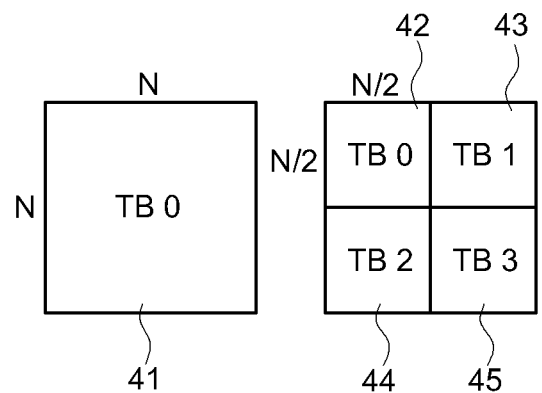
FIG. 5A to FIG. 6D are diagrams illustrating examples of transform blocks for a current coding block according to an embodiment of the present invention.
Figure 5B:
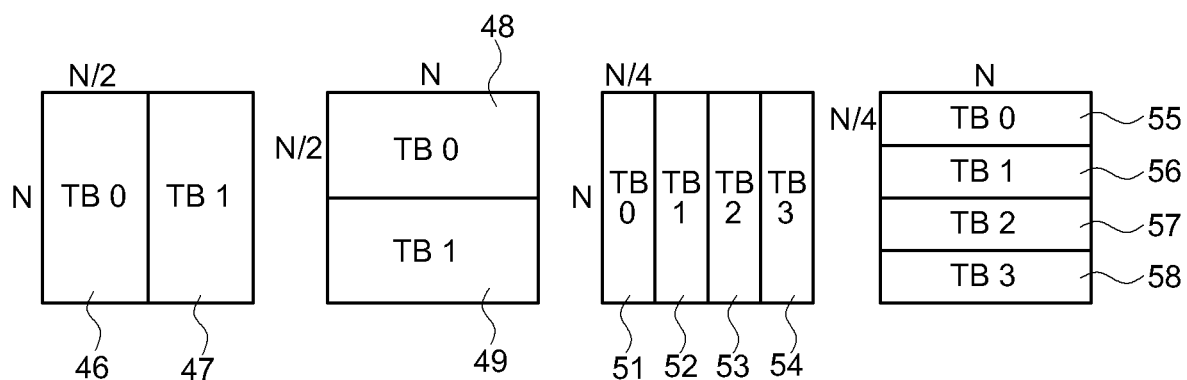
Figure 6A:
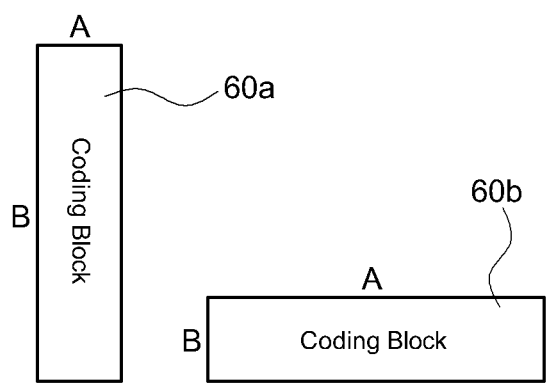
Figure 6B:
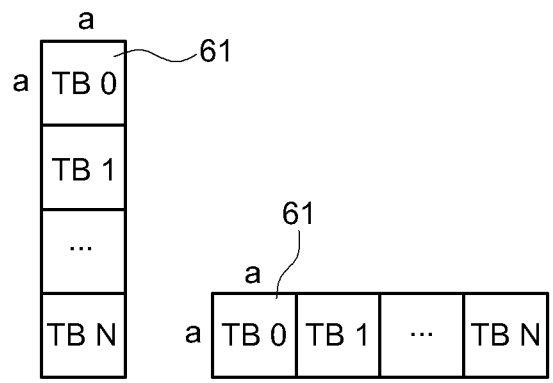
Figure 6C:
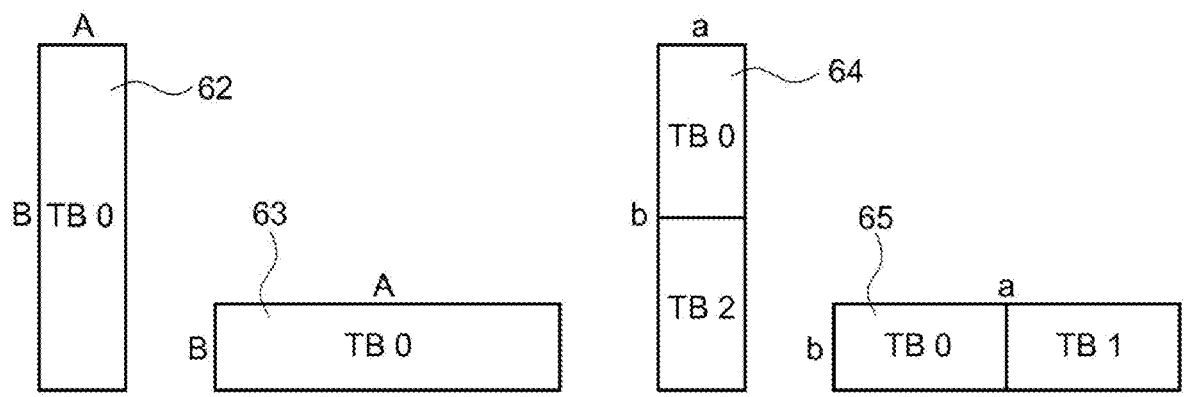

FIG. 5A-FIG. 6C illustrate examples of transform blocks for a current coding block according to an embodiment of the present invention. FIG. 5A and FIG. 5B are examples of the configuration of an initial transform block for a current coding block (not shown) of a square type of N×N size. FIG. 6A to FIG. 6C illustrate a configuration of an initial transform block for a non-square current coding block.

When one or a plurality of transform blocks are used for a current coding block of a square type, the transform block constituting the current coding block may include a square transform block and a non-square transform block. The transform block may transform the residual signal into a frequency region by using a transform matrix.

Referring to FIG. 5A, the square coding block may consist of one square transform block 41 or four square transform blocks 42 to 45 as a configuration of an initial transform block. In addition, referring to FIG. 5B, in the case using a square coding block, it may be composed of two non-square transform blocks 46 to 48 or four non-square transform blocks 51 to 58 as an initial transform block. The two non-square transform blocks may be the longitudinal non-square transform blocks 46, 47 of N/2×N size or the horizontal non-square transform blocks 48, 49 of N×N/2 size. The four non-square transform blocks may be the longitudinal non-square transform blocks 51 to 54 of N/4×N size or the horizontal non-square transform blocks 55 to 58 of N×N/4 size.

In this manner, when a transform block for a square coding block is constructed, an initial transform block may be constructed by a non-square transform block as well as a square transform block. Although two or four non-square transform blocks have been described above, the size and the number of the non-square transform blocks in the present invention are not limited thereto. In addition, when the current coding block performs intra-prediction, the transform block configuration of the current coding block may be determined differently according to the direction of the intra-prediction mode. For example, when the current coding block uses the intra-picture prediction mode of the vertical direction, the current transform block is enabled to generate the prediction signal by using the non-square transform block that is horizontally divided as the transform block for the current coding block, and the decoded reference samples at the top.

According to one embodiment referring to FIG. 6A-FIG. 6D, even when one or a plurality of transform blocks are used for a non-square current coding block (not shown), the transform block configuring the current coding block may include a square transform block and a non-square transform block.

Referring to FIG. 6A, in the present invention, the coding block may be non-square coding blocks 60a and 60b having a horizontal length A and a vertical length B which are different from each other. In this case, when initially configuring the current non-square coding block with one or a plurality of transform blocks, a square transform block may be used or a non-square transform block may be used to evenly divide the coding block.

Referring to FIG. 6B, N square transform blocks 61 having a×a size may be used as the initial transform block configuration for the non-square coding blocks 60a and 60b. In this case, the horizontal and the vertical length a of the square transform block 61 may be equal to the smaller one of the horizontal and vertical lengths of the non-square coding block. According to an embodiment of the present invention, the horizontal and vertical lengths of the square transform block 61 may be calculated from the upper parameters or obtained through a predetermined method.

Referring to FIG. 6C, M (where M is an integer) number of non-square transform blocks 62 to 65 may be used as a configuration of an initial transform block for the non-square coding blocks 60a and 60b. The non-square transform blocks 62 and 63 may be the same size as the non-square coding block 60a or may be non-square transform blocks 64 and 65 smaller than the non-square coding blocks 60a and 60b. According to an embodiment of the present invention, the horizontal length (a) and the vertical length (b) of the non-square transform blocks 62 and 63 may be set equal to the horizontal and vertical lengths of the coding blocks (60a and 60b). In another embodiment, the horizontal and vertical lengths of the non-square transform blocks 64 and 65 may be calculated from the parameters of high level or obtained through a predetermined method.

Figure 6D:
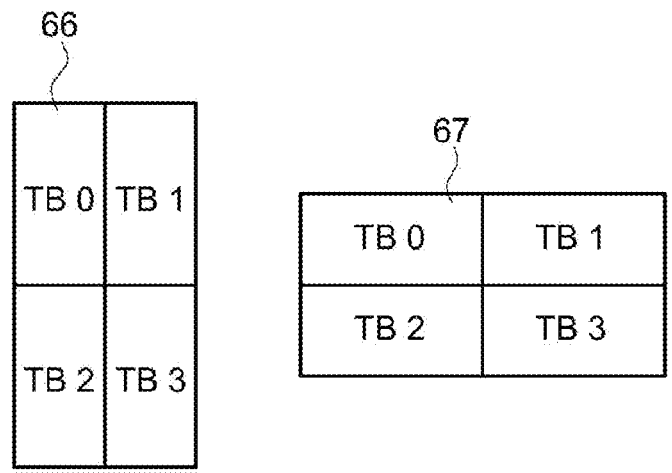

Further, referring to FIG. 6D, M non-square or square transform blocks 66 and 67 having a quad tree structure may be used as the configuration of the initial transform block for non-square coding blocks 60a and 60b. The non-square or square transform block 66, 67 may be used when since the size of the non-square coding block is large, only one transform block is not matched as a block having a smaller size than the non-square coding block. Although the transform blocks of the quad-tree structure are described in the present invention, the number of the non-square or square transform blocks 66 and 67 is not limited thereto.

The transform block constituting the current coding block may be divided into sub-transform blocks of a smaller size. The sub-transform blocks may generate transform coefficients by performing independent transform processes, respectively and may have various shapes and sizes. In addition, the dividing method may be determined differently based on the size and shape of transform block of the upper level before being divided into the sub-transform blocks, and may have a shape that is independently different from the shape of the transform block of the upper level.

Figure 8A:
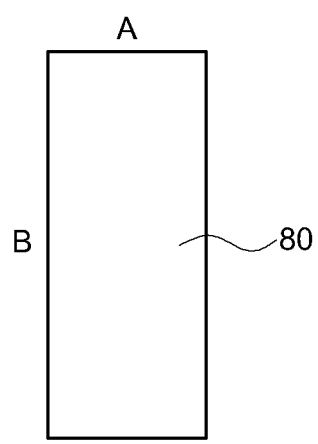
Figure 8B:
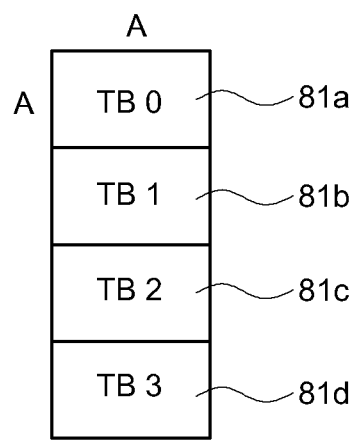
Figure 8C:
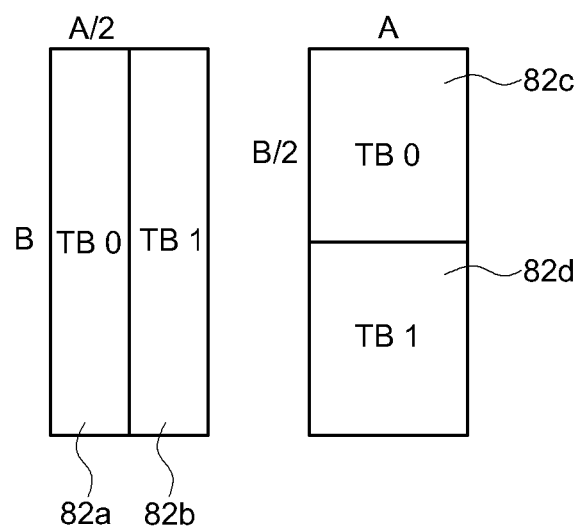
Figure 8D:
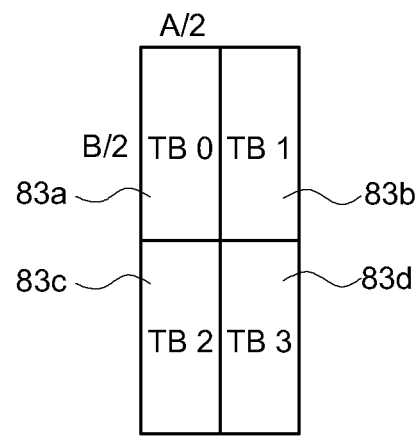
Figure 9A:
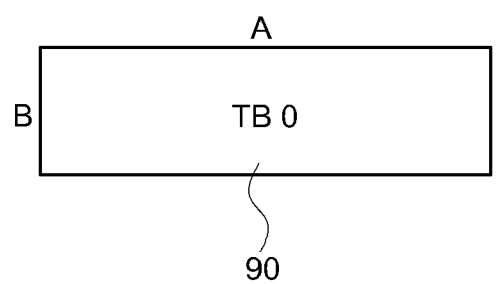
Figure 9B:
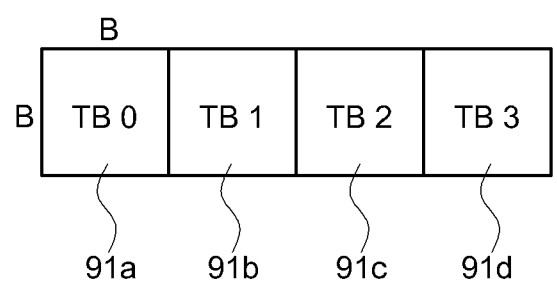
Figure 9C:
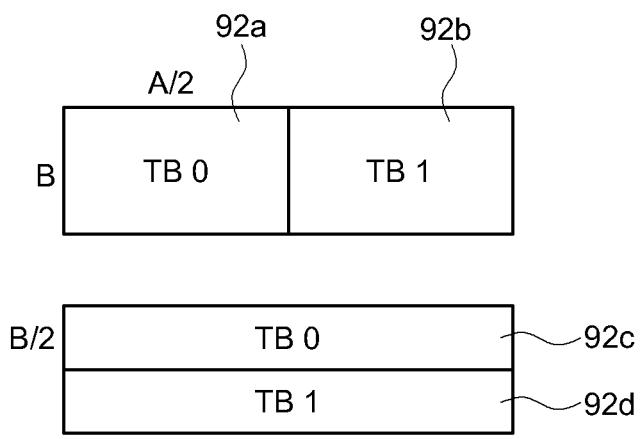
Figure 9D:
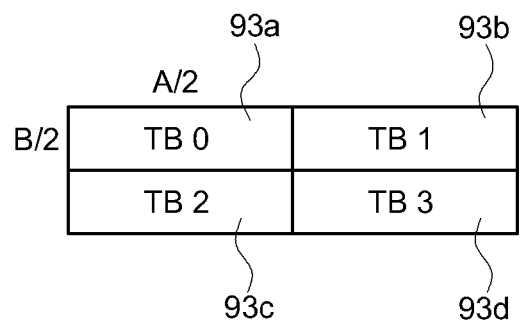
Figures 10, 11:
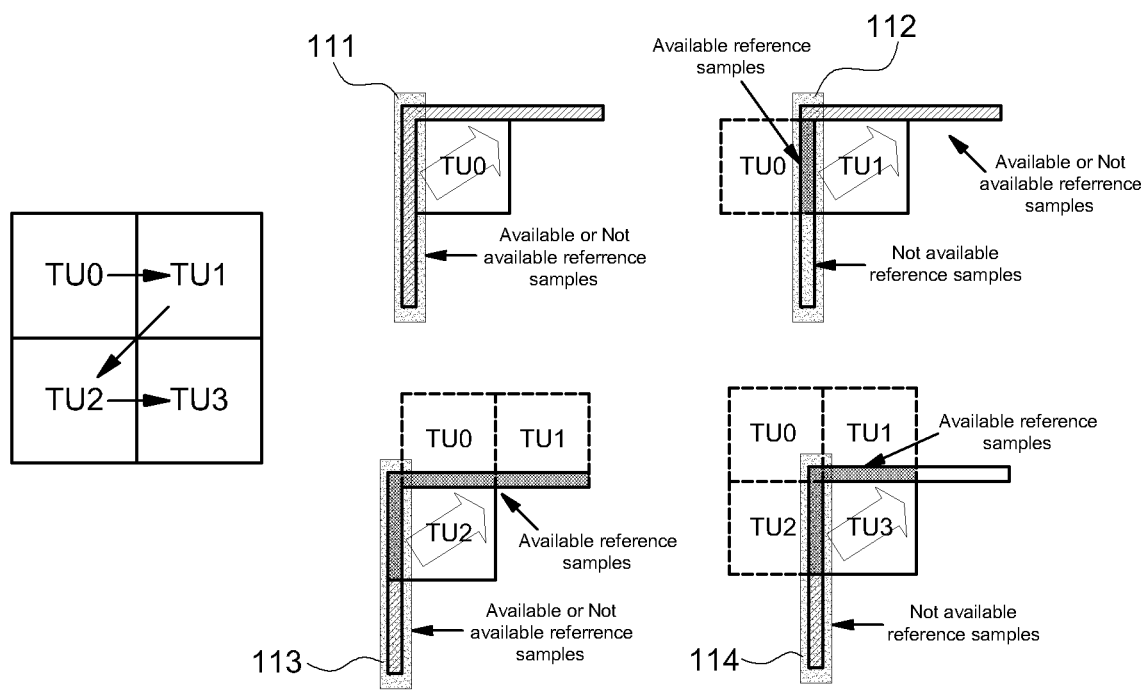
FIG. 11 is a diagram for explaining a coding procedure and a coding method of a transform block according to a general method.

FIG. 7A to FIG. 10 illustrate examples of sub-transform blocks according to an embodiment of the present invention. FIG. 7A to FIG. 7D show examples of the sub-transform blocks of the transform block when the transform block is a square transform block, and FIG. 8A to FIG. 8D show an example of sub-transform blocks when the transform block is a vertical non-square transform block. FIG. 9A to FIG. 9D illustrate examples of sub-transform blocks for a horizontal non-square transform block. FIG. 10 shows a transform block composed of various sub-transform blocks.

Figure 7A:
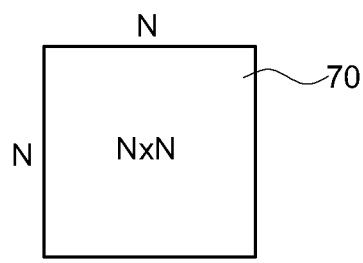
FIG. 7A to FIG. 10 are diagrams illustrating examples of sub-transform blocks according to an embodiment of the present invention.
Figure 7B:
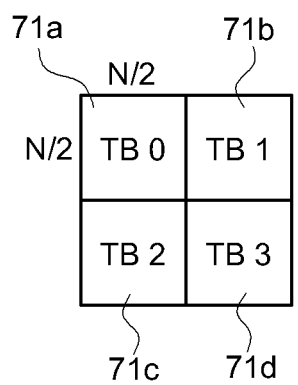
Figure 7C:
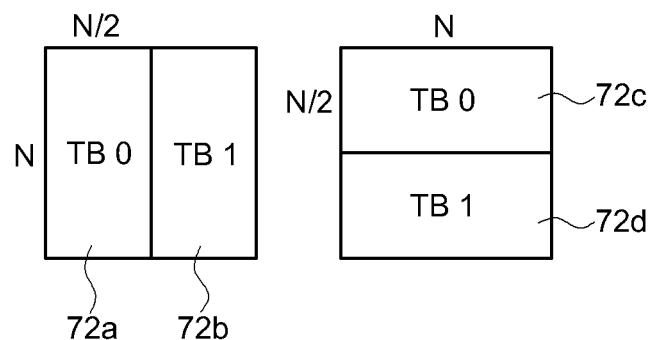
Figure 7D:
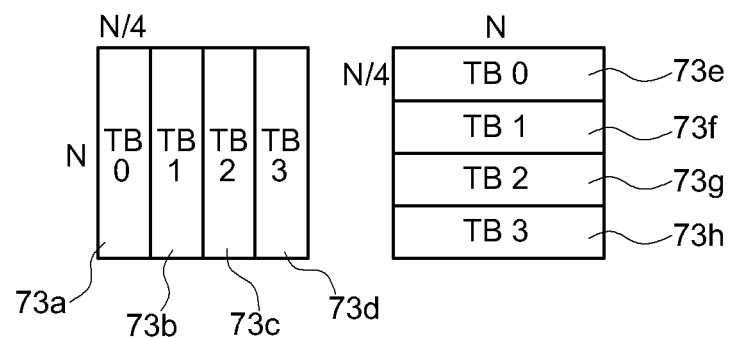

Referring to FIG. 7A to FIG. 7D, when the current transform block is the square transform block 70 of N×N size, the square transform block 70 is divided according to various methods to generate the sub transform blocks 71a to 73h. The square transform block 70 may be divided into the sub-transform blocks 71a to 71d. The square transform block 70 may be divided into four square sub-transform blocks 71a to 71d by using the square quad tree division method (FIG. 7B), and may also be divided into two non-square sub-transform blocks 72a to 72d in the vertical or horizontal direction by using a binary tree division method (FIG. 7C). According to an embodiment of the present invention, it may be divided into four non-square sub-transform blocks 73a through 73h in the vertical or horizontal direction by using the non-square quad tree division method (FIG. 7D). The number and size of sub-transform blocks to be divided are illustrative only and are not limited to the description of the present invention.

Referring to FIG. 8A to FIG. 8D, when the current transform block is a non-square transform block 80 having a size of A (horizontal length)×B (vertical length) as shown in FIG. 8A, the non-square transform block 80 may be divided in various ways to generate the sub-transform blocks 81a to 83d. The non-square transform block 80 may be divided into four sub-transform blocks 81a to 81d (FIG. 8B) by using the square quad tree division method, and may also be divided into five or more sub-transform blocks (not shown). In this case, the horizontal and vertical lengths of the square sub-transform blocks may be the same as the short length (A in FIG. 8A) of the horizontal and vertical lengths of the non-square transform block 80, but the present invention is not limited thereto. When the vertical length B of the non-square transform block 80 is an integer multiple of the horizontal length A, the non-square transform block 80 may be divided into sub-transform blocks according to the square division method as shown in FIG. 8B.

Referring to FIG. 8C, the non-square transform block 80 may be divided into two non-square sub-transform blocks 82a to 82d in the vertical or horizontal directions by using a binary tree division method. Referring to FIG. 8D, the non-square transform block 80 may be divided into four non-square sub-transform blocks 83a to 83d by using the non-square quad tree division method. The number and size of sub-transform blocks to be divided are illustrative only and are not limited to the description of the present invention Referring to FIG. 9A to FIG. 9D, when the current transform block is a non-square transform block 90 having a size of A (a horizontal length)×B (a vertical length) as shown in FIG. 9A, the non-square transform block 90 may be divided into sub-transform blocks (91a to 93d) by using various methods. The non-square transform block 90 may be divided into four sub-transform blocks 91a to 91d (FIG. 9B) by using square quad tree division method, and may also be divided into five or more sub-transform blocks (not shown). In this case, the horizontal and vertical lengths of the square sub-transform blocks may be the same as the short length (B in FIG. 9A) of the horizontal and vertical lengths of the non-square transform block 90, but the present invention is not limited thereto. When the horizontal length A of the non-square transform block 90 is an integer multiple of the vertical length B, the non-square transform block 90 may be divided into sub-transform blocks according to the square division method as shown in FIG. 9B.

Referring to FIG. 9C, the non-square transform block 90 may be divided into two non-square sub-transform blocks 92a to 92d in a vertical direction or a horizontal direction by using a binary tree division method. Referring to FIG. 9D, the non-square transform block 90 may be divided into four non-square sub-transform blocks 93a to 93d by using the non-square quad tree division method. The number and size of sub-transform blocks to be divided are illustrative only and are not limited to the description of the present invention.

FIG. 10 shows an example in which a current coding block is transformed by using the dividing method as shown in FIGS. 7A to 9D. Referring to FIG. 10, a non-square transform block as well as a square transform block may be applied for the current coding block, and the square or non-square transform blocks may be divided into a square sub-transform block as well as a square sub-transform block. This transform block application and the division into sub-transform blocks may be applied according to one method or in combination with more than two methods among the methods shown in FIG. 7A to FIG. 9D. Also, the shape and the number of the transform block or the shape and the number of the sub-transform block are not limited to the example of the present invention.

In general, when the current block performs intra-prediction, a transform block is decoded by using a raster scan method, and reference samples used for generating a prediction signal according to the direction of the intra-prediction mode are determined.

FIG. 11 is a diagram for explaining a coding procedure and a coding method of a transform block according to a general method. Referring to FIG. 11, when the intra-picture prediction mode of the current block is 2 to 10, each of the transform blocks TU0 to TU3 always generates a prediction signal by using only the reference samples located at the left direction of the transform block. In this case, the first transform block TU0, which first generates the prediction signal among the transform blocks, generates the prediction signal by using the first reference sample region 111 located in the transform block. The first reference sample region 111 may be comprised of available reference samples and/or non-available reference samples. Thereafter, in connection with the second transform block TU1, it is also understood that the second reference sample region 112 is composed of some pixels of the first transform block TU0 which are decoded samples, i.e., available reference samples because some pixels of the first transform block TU0 constitutes the second reference sample region 112 for the second transform block TU1.

Thereafter, since the third transform block TU2 generating the prediction signal uses the pixels located on the left side of the third transform block TU2 as reference samples, it does not use the pixels of the decoded first transform block TU0 and the second transform block TU2. Consequently, the third reference sample region 113 used for prediction may be composed of non-available reference samples. The fourth transform block TU3 constitutes the fourth reference sample region 114 for the fourth transform block TU3, by using some pixels of the third transform block TU2. Therefore, it may be seen that the fourth reference sample region 114 consists of some pixels of the third transform block TU2, i.e., the available reference samples, which are decoded samples.

In this manner, when a prediction signal is generated from a transform block in accordance with a conventional coding order, there may occur cases where a prediction signal is generated by using non-available reference samples according to the direction of the intra-prediction mode. Therefore, the coding method of the video signal according to the embodiment of the present invention may increase the coding efficiency by variably determining the coding order of the transform blocks according to the direction of the intra-picture prediction mode of the current coding block.

Figure 12A:
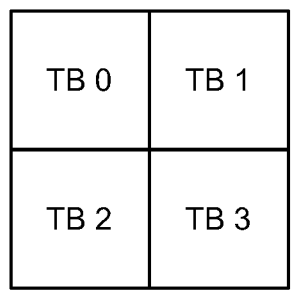
FIG. 12A to FIG. 12C are diagrams illustrating examples of transform blocks in accordance with an embodiment of the present invention.
Figure 12B:
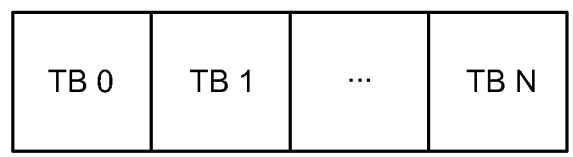
Figure 12C:
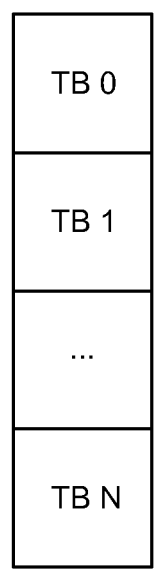

FIG. 12A-FIG. 12C illustrate examples of transform blocks in accordance with an embodiment of the present invention.

FIG. 12A to FIG. 12C, the transform blocks according to an embodiment of the present invention may be a structure in which the structure in which four transform blocks of the same size are composed of two lines (FIG. 12A). Alternatively, the transform blocks of the same size may be arranged horizontally or vertically (FIG. 12B and FIG. 12C). The transform blocks may be subdivided into sub-transform blocks of a smaller size, and the sub-transform blocks may have a structure as shown in FIGS. 12A to 12C at the time of subdivision If the transform blocks are coded without considering the intra-picture prediction mode of the current block, the neighbor blocks which have not been decoded may be used when generating the prediction signal of each transform block. In this case, since the reference samples used for generating the prediction signal may be unavailable samples, the available sample values in the vicinity may use the copied unavailable samples and thereby, the encoding efficiency may be deteriorated. Accordingly, the present invention proposes a method for variably determining a coding order of a transform block by considering which mode region the intra-picture prediction mode of the current block corresponding to the transform blocks belongs to.

Figure 13:
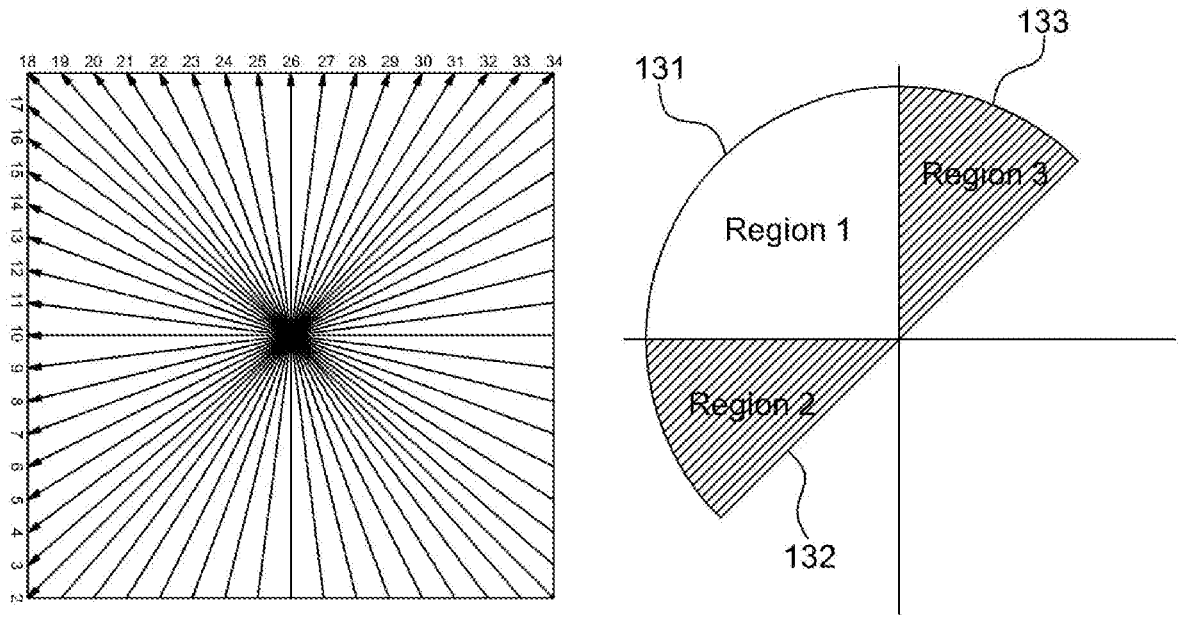
FIG. 13 are diagrams illustrating the mode regions to which an intra-picture prediction mode according to an embodiment of the present invention belongs.

In order to variably determine the coding order of the transform blocks according to the intra-prediction mode, first of all, the intra-picture prediction mode may be first classified according to the prediction direction. FIG. 13 illustrates mode regions to which an intra-picture prediction mode according to an embodiment of the present invention belongs.

Referring to FIG. 13, intra-picture prediction modes having directionality may be divided into a first mode region to a third mode region 131 to 133 according to a prediction direction. Except the intra-picture prediction mode of a vertical direction and the horizontal direction illustrated in FIG. 13, the intra-picture prediction modes having an angle of 90° to 180° may be an intra-picture prediction mode constituting the first mode region 131. The second mode region may be an intra-picture prediction mode having an angle of 180° to 225° and the third mode region may be an intra-picture prediction mode having the prediction mode in the vertical direction and an angle of 45° to 90°. The coding order of the transform blocks may be variably determined according to the mode region to which the transform blocks belong, based on the mode region classified in this manner.

Figure 14A:
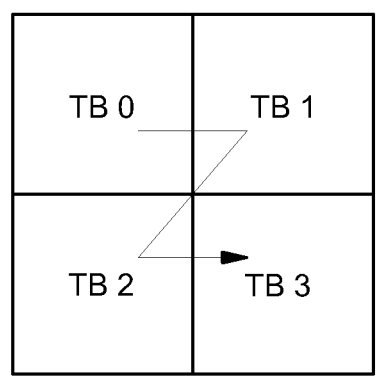
FIGS. 14A and 14B are diagrams illustrating the coding order of transform blocks when the intra-picture prediction mode of the current block belongs to the first mode region according to an embodiment of the present invention.
Figure 14B:
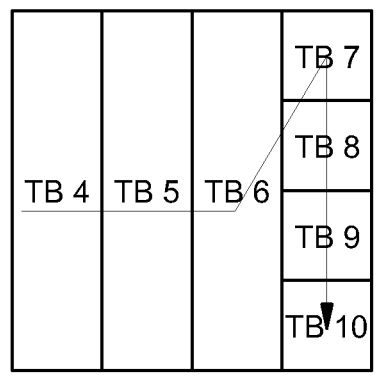

FIG. 14A and FIG. 14B show the coding order of transform blocks when the intra-picture prediction mode of the current block according to an embodiment of the present invention belongs to the first mode region. The coding order of the transform blocks in the case of belonging to the first mode region is the same as the coding order of the conventional transform blocks. FIG. 14A shows the coding order when the transform blocks have an N×N structure and may be coded in the order TB0, TB1, TB2, TB3. FIG. 14B shows the coding order when the transform blocks are non-square transform blocks in the vertical and horizontal directions, and is coded in order from left to right and top to bottom. For example, the coding may be performed according to the order of TB4, TB5, TB6, TB7, TB8, TB9, and TB10.

Figure 15A:
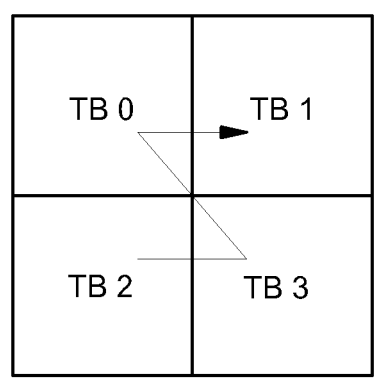
FIG. 15A to FIG. 15C are diagrams illustrating the coding order of transform blocks when the intra-picture prediction mode of the current block according to an embodiment of the present invention belongs to the second mode region.
Figure 15B:
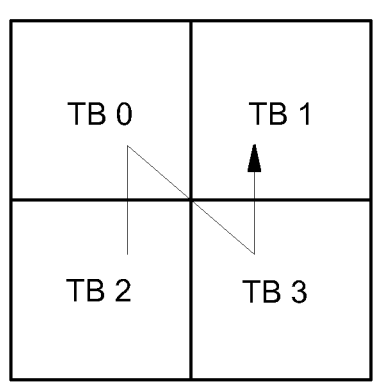
Figure 15C:
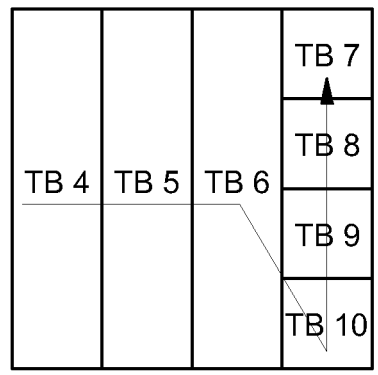

FIGS. 15A to 15C illustrate coding sequences of the transform blocks in which the intra-picture prediction mode according to an embodiment of the present invention belongs to the second mode region. The plurality of transform blocks may be coded in order from the bottom left to the top right, and the transform blocks having the N×N structure may be coded as shown in FIG. 15A and FIG. 15B.

Referring to FIG. 15A, TB2, TB0, and TB1 may be coded in the order of TB2 located at the lower left side, TB3, TB0, and TB1, and referring to FIG. 15B, may be coded in the order of TB2 located at the lower left side, TB0 TB3, and TB1.

Further, the non-square transform blocks in the vertical and horizontal directions may be coded in order from left to right and from bottom to top. Referring to FIG. 15C, TB4 located on the left side, TB5 and TB6 may be coded in order, and TB10 located on the lower right side, TB9, TB8, and TB7 may be coded in order.

Figure 16A:
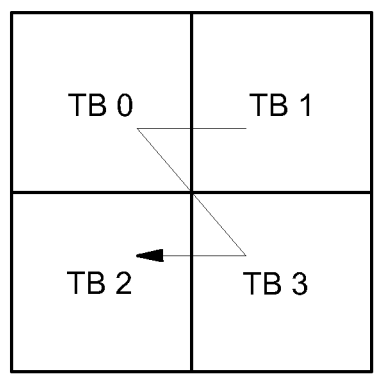
FIG. 16A to FIG. 16C are diagrams illustrating the coding order of transform blocks when the intra-picture prediction mode of the current block belongs to the third mode region according to an embodiment of the present invention.
Figure 16B:
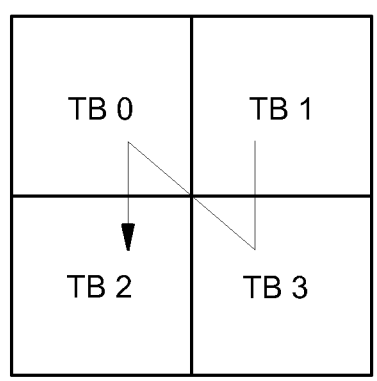
Figure 16C:
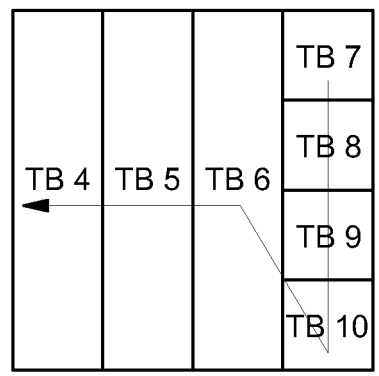

FIG. 16A to FIG. 16C illustrate coding sequences of transform blocks in which an intra-picture prediction mode according to an embodiment of the present invention belongs to a third mode region. The plurality of transform blocks may be coded in order from the upper right to the lower left, and the transform blocks having the N×N structure may be coded as shown in FIG. 16A and FIG. 16B. Referring to FIG. 16A, the coding may be performed in order of TB1 located at the upper right, TB0, TB3, and TB2, and referring to FIG. 16B, the coding may be performed in order of TB1 located at the upper right, TB3, TB0, and TB2.

In addition, the non-square transform blocks in the vertical and horizontal directions may be coded in order from right to left, and from top to bottom. Referring to FIG. 16C, TB8, TB9, and TB10 are sequentially coded from the TB7 located at the upper right, and the coding may be performed in order of TB6, TB5, and TB4 located on the right side among the non-square transform blocks in the left vertical direction.

In this manner, when variably determining the coding order of the transform block in consideration of the shape of the transformed block, and the mode region separated in consideration of the direction of the intra-picture prediction mode of the current block, each transform block may generate the prediction signal by using the available reference samples of the decoded neighboring blocks. Therefore, the coding efficiency may be improved.

According to an embodiment of the present invention, when the transform blocks have a structure of the type shown in FIG. 12A to FIG. 12C, the coding order of the transform blocks determined according to the mode region to which the intra-prediction mode of the current coding block corresponding to the transform blocks belongs is shown in Table 1 below.

TABLE 1

| type of the transform block structure | Type of the transform block structure Intra-picture prediction mode region | | |
| --- | --- | --- | --- |
| | Region 1 | Region 2 | Region 3 |
| Type 1 (FIG. 12A) | TB0->TB1->TB2->TB3 | TB2->TB3->TB0->TB1 | TB1->TB0->TB3->TB2 |
| Type 2 (FIG. 12B) | TB0->TB1->...->TBN | TB0->TB1->...->TBN | TBN->...->TB1->TB0 |
| Type 3 (FIG. 12C) | TB0->TB1->...->TBN | TBN->...->TB1->TB0 | TB0->TB1->...->TBN |

Figure 17A:
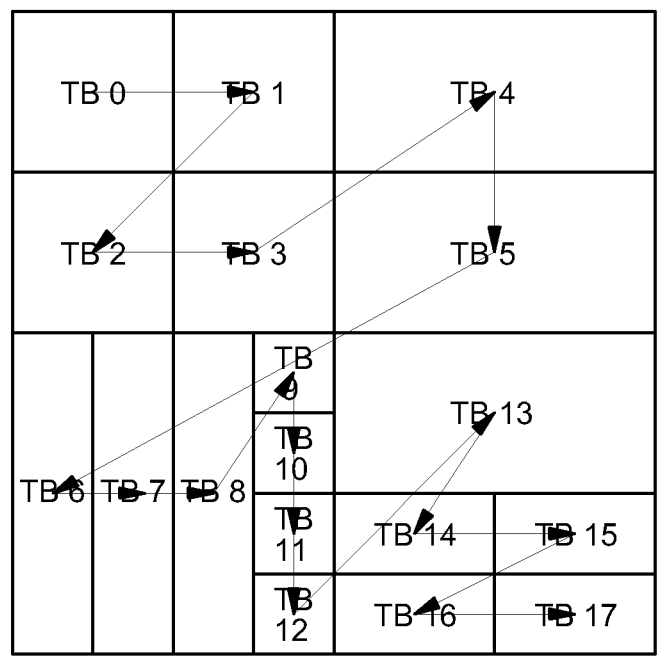
FIG. 17A to FIG. 19C are diagrams illustrating various examples of a procedure for coding a square block and a non-square transform block by applying the coding order of transform blocks in consideration of an intra-picture prediction mode according to an embodiment of the present invention.
Figure 17B:
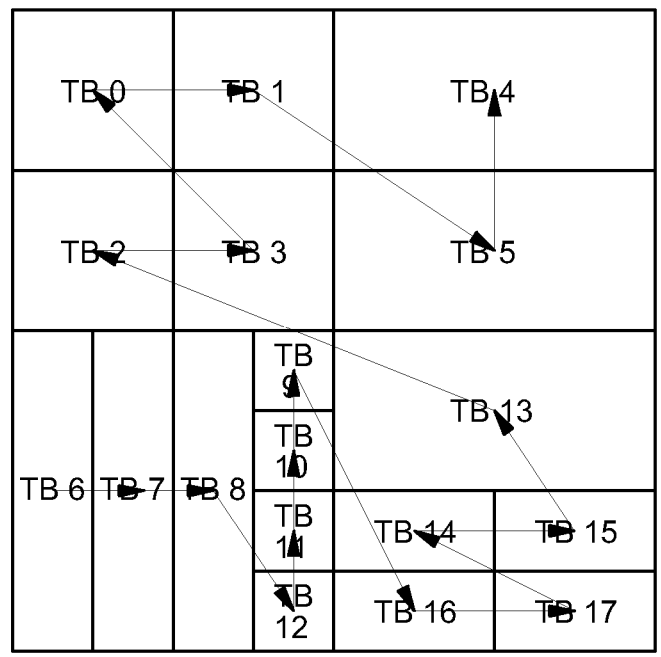
Figure 17C:
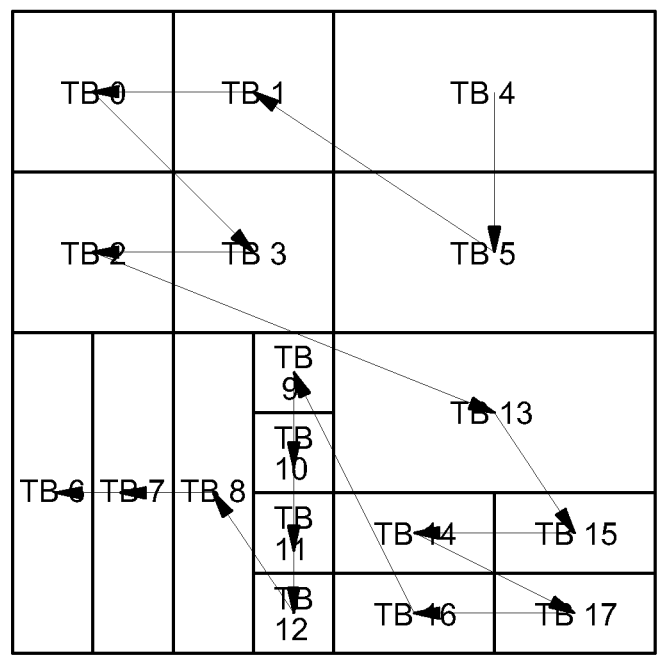

FIGS. 17A to 17C are examples showing the coding sequences of square and the non-square transform blocks constituting a current block by using the coding order of the transform blocks shown in Table 1.

FIG. 17A shows the coding order of the transform blocks for the current block when the intra-picture prediction mode of the current block belongs to the first mode region. FIG. 17B shows the coding order of the transform blocks for the current block when the intra-picture prediction mode of the current block belongs to the second mode region. FIG. 17C shows the coding order of the transform blocks for the current block when the intra-picture prediction mode of the current block belongs to the third mode region.

Referring to FIG. 17A, when the intra-prediction mode of the current block belongs to the first mode region, the transform blocks may be coded according to the order from the upper left corner to the lower right corner in the same manner as the normal coding order regardless of the shape of the transform block. Further, if the intra-picture prediction mode of the current block belongs to the second mode region, the transform block uses the reference samples belonging to the lower left block when generating the prediction signal. Therefore, the step for coding the transform block according to the order from the lower left end to the upper right end may improve the coding efficiency.

Referring to FIG. 17B, a current block may be coded in order from the lower left to the upper right, and the coding order such as the lower left, lower right, upper left, and upper right may be selected.

If the intra-prediction mode of the current block belongs to the third mode region, since the transform block uses the reference samples belonging to the upper right corner when generating the prediction signal, the step for coding the transform block in the order from the upper right to the lower left may improve the coding efficiency. Referring to FIG. 17C, it is possible to select a coding method in the order of upper right, upper left, lower right, and lower left.

In another embodiment, the coding order of the transform block considering the intra-prediction mode may be determined as shown in Table 2 below.

TABLE 2

| type of the transform block structure | Type of the transform block structure Intra-picture prediction mode region | | |
|---|---|---|---|
| | The first mode region | The second mode region | The third mode region |
| Type 1 (FIG. 12A) | TB0->TB1->TB2->TB3 | TB2->TB0->TB3->TB1 | TB1->TB3->TB0->TB2 |
| Type 2 (FIG. 12B) | TB0->TB1-> . . . ->TBN | TB0->TB1-> . . . ->TBN | TBN-> . . . ->TB1->TB0 |
| Type 3 (FIG. 12C) | TB0->TB1-> . . . ->TBN | TBN-> . . . ->TB1->TB0 | TB0->TB1-> . . . ->TBN |

Figure 18A:
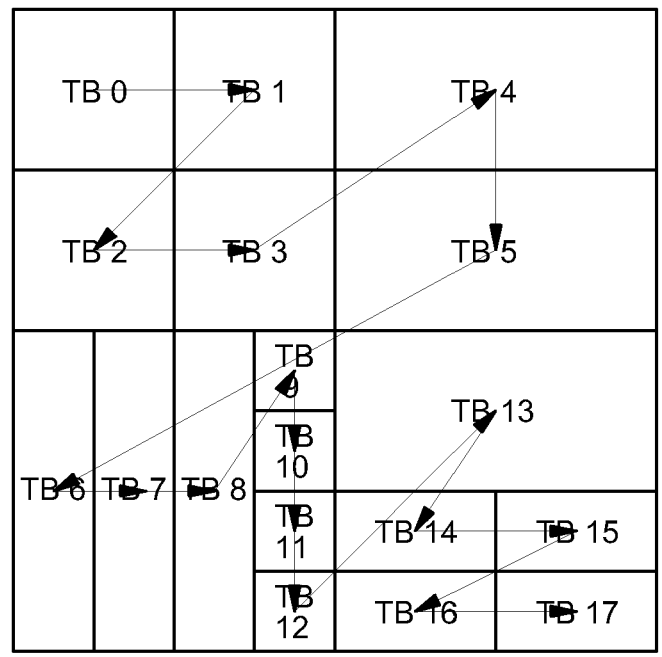
Figure 18B:
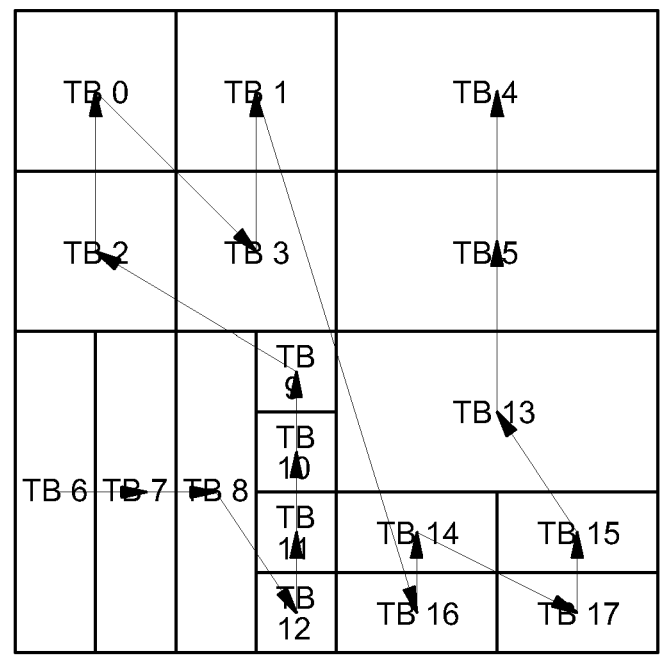
Figure 18C:
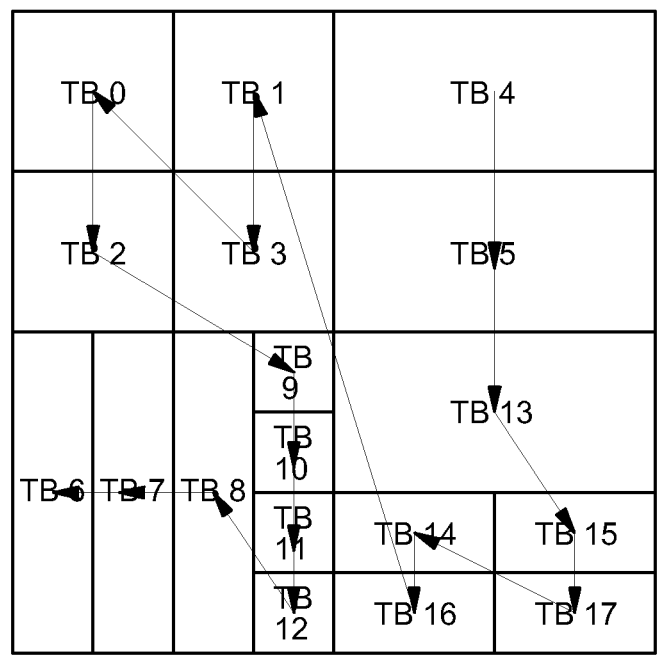

FIGS. 18A to 18C are examples showing coding sequences of square and non-square transform blocks constituting a current block by using the coding sequence of the transform block shown in Table 2.

FIG. 18A shows the coding order of the transform blocks for the current block when the intra-picture prediction mode of the current block belongs to the first mode region. FIG. 18B shows the coding order of the transform blocks for the current block when the intra-picture prediction mode of the current block belongs to the second mode region. FIG. 18C shows the coding order of the transform blocks for the current block when the intra-picture prediction mode of the current block belongs to the third mode region.

Referring to FIG. 18A, when the intra-picture prediction mode of the current block belongs to the first mode region, the transform blocks may be coded in order from the upper left to the lower right in the same manner as the normal coding order, irrespective of the shape of the transform block. Further, If the intra-picture prediction mode of the current block belongs to the second mode region, since the transform block uses the reference samples belonging to the lower left block when generating the prediction signal, the step for coding the transform block according to the order from the lower left end to the upper right end may improve the coding efficiency. Referring to FIG. 18B, when coding a current block in order from the lower left to the upper right, the coding performed according to the order of the lower left, upper left, lower right, and upper right may be selected.

If the intra-prediction mode of the current block belongs to the third mode region, since the transform block uses the reference samples belonging to the upper right when generating the prediction signal, the step for coding the transform block in the order from the upper right to the lower left may improve the coding efficiency. Referring to FIG. 18C, it is possible to select a coding method in the order of the upper right, lower right, the upper left, and the lower left.

Figure 19A:
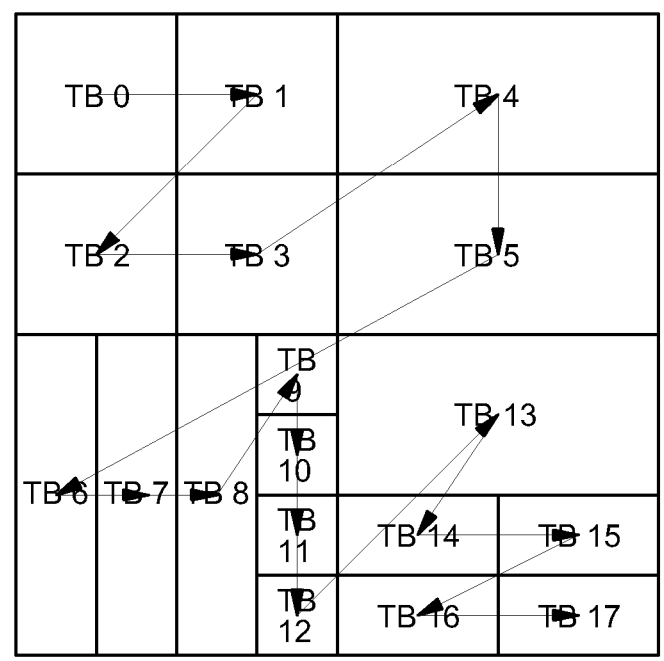
Figure 19B:
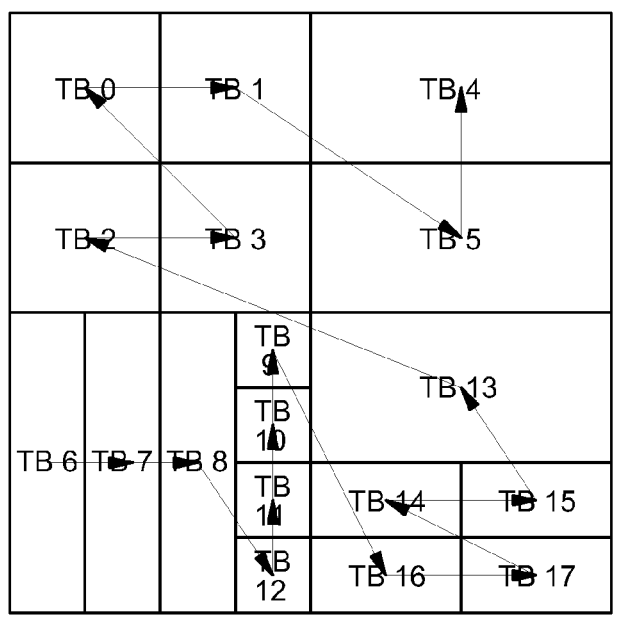
Figure 19C:
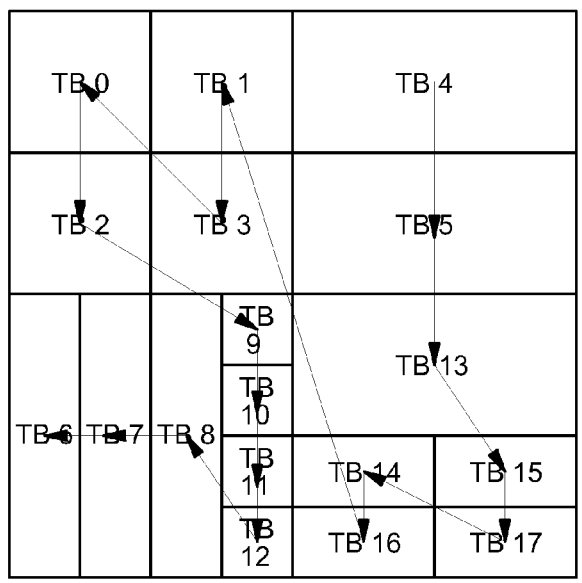

The coding order of the transform blocks according to the mode region is not limited to the above example, but the order may be determined as combination of the above examples FIGS. 19A through 19C show the coding order of the transform blocks when the coding order of the transform blocks according to each mode region is alternately selected as explained with referring to FIGS. 17A through 18C.

FIG. 19A shows the coding order of the transform blocks for the current block when the intra-picture prediction mode of the current block belongs to the first mode region. FIG. 19B shows the coding order of the transform blocks for the current block when the intra-picture prediction mode of the current block belongs to the second mode region. FIG. 19C shows the coding order of the transform blocks for the current block when the intra-picture prediction mode of the current block belongs to the third mode region.

In the case of the first mode region, the coding order of the transform blocks may be determined as the order processed from the upper left to the lower right as described with reference to FIGS. 17A and 18A. In the case of the second mode region, referring to FIG. 19B, the transform blocks may be encoded in order of the lower left, the lower right, the upper left, and the upper right according to the coding order determined with reference to FIG. 17B. Referring to FIG. 19C, when the intra-picture prediction mode of the current block is the third mode region, the transform blocks may be coded in order of the upper right, the lower right, the upper left, and the lower left according to the coding order described with reference to FIG. 18C. In another embodiment, the coding order of the second mode region and the third mode region may be determined in the coding order described with reference to FIG. 18B and FIG. 17C. In this manner, the transform blocks for the current block generate a prediction signal by using a combination of various coding sequences determined according to the intra-picture prediction mode of the current block, thereby improving the coding efficiency.

Figure 21:
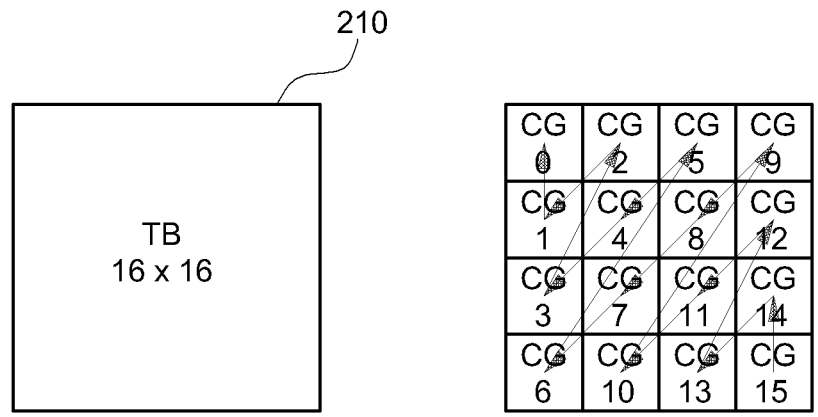
FIG. 21 is a diagram illustrating a transform coefficient group constituting a general 16×16 transform block.

FIG. 20 and FIG. 21 are the diagrams for explaining the structure of the transform block according to the general method and the transform coefficient group for constructing the 16×16 transform block.

Referring to FIG. 20, one coding block CB may include a plurality of transform blocks TB0, TB1, . . . , TB12. The plurality of transform blocks may include transform blocks having various shapes and/or sizes. The transform block may include a square block and a non-square block, and the transform block may be any one of the blocks having a square quad tree structure, a non-square quad tree structure, or a binary tree and may be one of blocks having a binary tree structure.

Referring to FIG. 21, the transform block 210 may include at least one or more transform coefficient groups CG0, CG1, . . . , CG15. For example, the transform block 210 is a 16×16 block, and the transform coefficient group included in the transform block may have a size of 4×4. That is, the 16×16 transform block may include 16 transform coefficient groups of 4×4 size, and the index of the transform coefficient group may follow the transform coefficient scan order as shown in FIG. 21.

Figure 22:
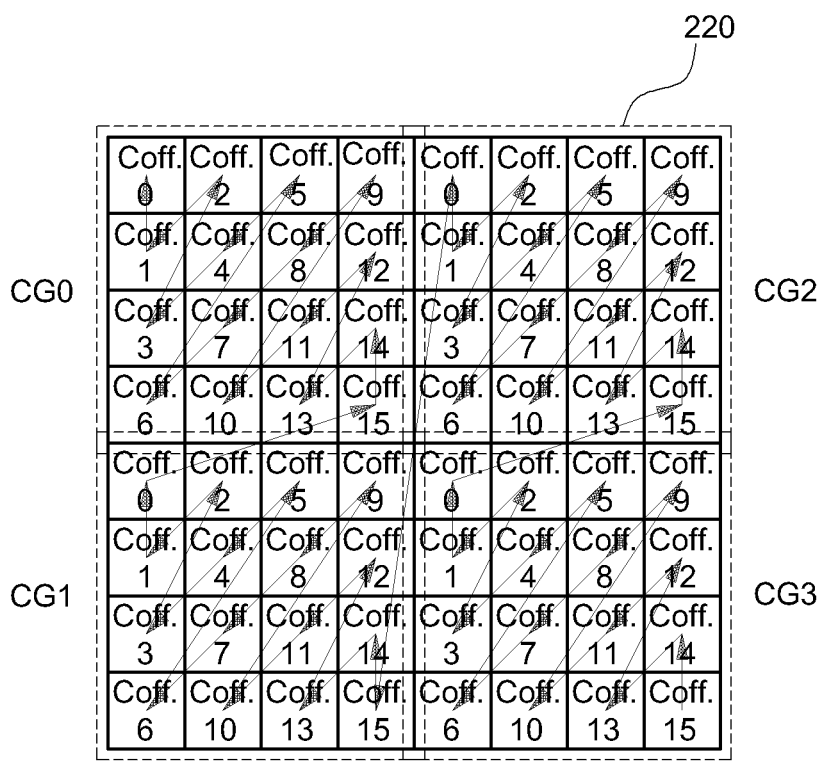
FIG. 22 is a diagram illustrating a transform coefficient group and a transform scan method of the transform coefficient group according to a general method.

FIG. 22 is a diagram for explaining a transform coefficient group according to a general method and a transform scan method for the transform coefficient group.

Referring to FIG. 22, in general, the scan order of the transform coefficient group of the transform block 220 may be the same as the scan order of the transform coefficients. For example, if the transform block 220 has a size of 8×8, the transform coefficient group is a block of 4×4 size, and the up-right diagonal scan method is used for the transform block 20, the same scan method as that of the transform coefficient is applied to the transform coefficient group. As shown in FIG. 22, the transform coefficient is scanned according to the up-right diagonal method from the transform coefficient 15 to 0 included in the transform coefficient group CG3 positioned at the lower right of the transform block 220. Then, the transform coefficients are scanned in the same manner for the transform coefficient group CG2 positioned at the upper right. Thereafter, the transform coefficients included in the transform coefficient group in the order of the transform coefficient group CG1 at the lower left and the transform coefficient group CG0 at the upper left are scanned in the same manner.

Figures 23D, 24A, 24B:
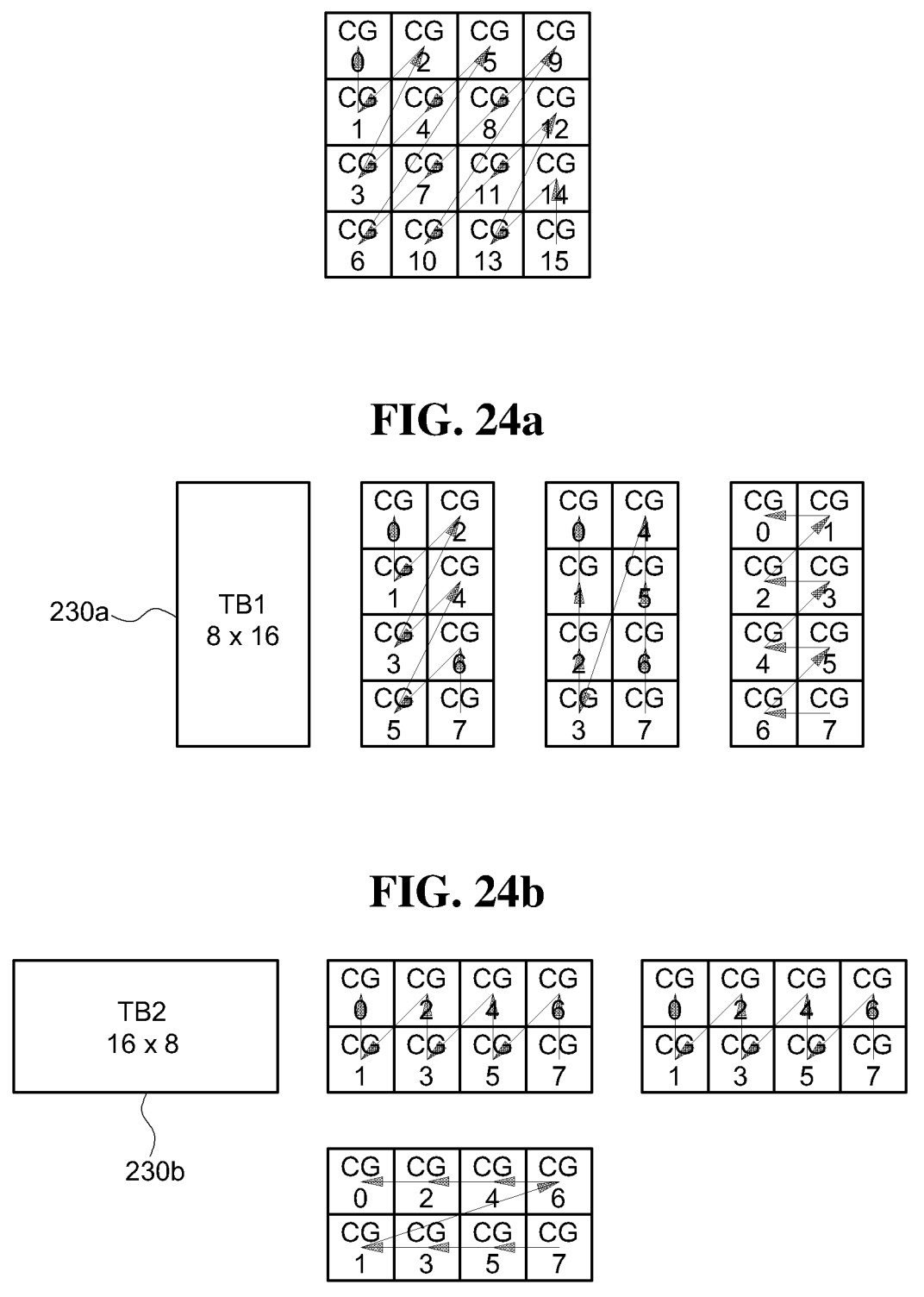

FIG. 23A to FIG. 23D are the diagrams for explaining various examples of methods for scanning the transform coefficient and the transform coefficient group according to the general method. FIG. 23A to FIG. 23C show the scan method of the transform coefficient group in the intra-picture prediction mode, and FIG. 23D shows the scan method of the transform coefficient group in the inter-picture prediction mode.

Referring to FIGS. 23A to 23C, when intra-picture prediction is performed, an up-right diagonal scan (FIG. 23A) which scans according to the order from the lower right to the upper left may be used. A horizontal scan (FIG. 23B) method which scans from right to left and from bottom to top may be used. A vertical scan method (FIG. 23C) which scans from the bottom to the top and from the right side to the left side may be used. Referring to FIG. 23D, in the case of inter-picture prediction, only the up-right diagonal scan method may be used.

According to an embodiment of the present invention, the method for scanning the transform coefficient group in the intra-prediction may be determined according to the intra-prediction mode. For example, when the intra-prediction mode is the intra-prediction mode indices 6 to 14, which are predictions in the horizontal direction, the transform coefficient group may be scanned by using the vertical scan method, and when the intra-picture prediction mode is the index 22 to 30, which is the prediction in the vertical direction, the horizontal scan method is employed. The up-write diagonal scan method may be used for the residual intra-picture prediction mode.

Until recently, video coding has always considered a square transform block as a transform block. Therefore, as the scan method of the transform coefficient group and the transform coefficient within the transform coefficient group, it has also been designed to be suitable for the square transform block. However, when the non-square transform block is used as the transform block, the coding efficiency may be degraded when the existing scan method for transform coefficient group and the transform coefficient are applied. Therefore, in the following description with reference to FIGS. 24A to 30D, a method of scanning the transform coefficient group capable of improving coding efficiency according to an embodiment of the present invention will be described.

FIG. 24A and FIG. 24B are views for explaining an example in which a general scan method is applied to a transform block according to an embodiment of the present invention.

Referring to FIG. 24A, when the current transform block TB1 (230a) is a non-square block and has a size of 8×16, if a conventional method is applied as a method for scanning a transform coefficient group and a transform coefficient, any one of three scan methods may be selected. For example, let us consider an example for scanning the transform coefficient group by applying the existing three scan methods to the current transform block 230a. For example, an up-right scan method, a vertical scan method, and a horizontal scan method may be applied from the left side to scan the transform coefficient group.

Referring to FIG. 24B, when the current transform block TB2 (230b) is a non-square block and has a size of 16×8, if a conventional method is applied as a method for scanning a transform coefficient group and a transform coefficient, any one of three scan methods may be selected. For example, let us consider an example for scanning the transform coefficient group by applying the existing three scan methods to the current transform block 230b. For example, an up-right scan method, a vertical scan method, and a horizontal scan method may be applied from the left side to scan the transform coefficient group.

Figure 25:
FIG. 25 is a diagram illustrating an example in which a general scan method is applied to a transform coefficient of a 16×8 transform block.

FIG. 25 is a diagram for explaining an example in which a general scan method is applied to a transform coefficient of a 16×8 transform block.

Referring to FIG. 25, when the horizontal scan method is applied to the current transform block TB2 (230b), the horizontal transform method, which is the same scan method, may be applied to the transform coefficient and the transform coefficient group. For example, a plurality of transform coefficient groups including a plurality of transform coefficients may be scanned for each transform coefficient group. The transform coefficients included in the transform coefficient group located at the lower right of the transform block are scanned according to the horizontal method and then, the transform coefficients included in the transform coefficient group located at the left of the transform coefficient group located at the lower right may be scanned according to the horizontal method. Thereafter, the transform coefficient group unit may be scanned in the manner which is identical to the horizontal scanning manner.

Through this transform process, most of the energy of the residual signal may be collected in the upper left DC region. Therefore, for the efficiency of entropy coding, it may be efficient for the transform coefficients and/or transform coefficient groups in the low frequency region to have indices that represent the scan order of the small value. However, when applying the scan order of a general transform coefficient group as shown in FIGS. 24A to 25 with respect to the non-square transform block, the transform coefficient group of the high frequency region may be coded before the transform coefficient group of the low frequency region. Thus, the coding efficiency may be deteriorated.

Therefore, a method for scanning a transform scan coefficient according to an embodiment of the present invention may include a step for partitioning a transform block into a transform region, which is an upper region including a plurality of transform scan coefficients; and a step for scanning transform scan coefficients for each of the divided transform regions.

FIG. 26 and FIG. 27 illustrate a flow diagram and apparatus illustrating a method for scanning a group of transform coefficients according to an embodiment of the present invention.

Referring to FIGS. 26 and 27, the transform unit transforms may acquire a transform region information representing a transform region in which a plurality of transform coefficient groups included in a transform block are divided into at least one or more one segments in the transform region information obtaining unit 240 in order to scan a group of transform coefficients (S10). The transform block may have various sizes and/or shapes. According to an embodiment of the present invention, the transform block may be a non-square transform block.

The transform region information may partition the transform block into at least one or more regions, and each transform region may include a plurality of transform coefficient groups. It goes without saying that the transform coefficient group includes a plurality of transform coefficients. In addition, the transform region information may be information received from the encoder. For example, the transformation region information may be obtained from at least one of a sequence parameter set (SPS) and a slice header, and the present invention is not limited thereto. The present invention does not limit a type and a syntax level related to the information. However, there are no problems if it may be information received from the encoder.

According to an embodiment of the present invention, the transform region information may be obtained in a predetermined manner in the decoding apparatus. For example, the transform region information may be obtained by calculating horizontal length and the vertical length of the transform region based on the horizontal length and the vertical length of the transform block, and determining the size and number of the transform region. Alternatively, the transform region information may also determine the size and the number of the transform region by dividing the smaller length of the horizontal and vertical lengths of the transform block by the block size of the transform coefficient group. The horizontal and vertical lengths, the shape, and the number of the transform region indicated by such a transform region information may be determined according to the method determined by the decoding apparatus and are not limited to the examples described above.

Then, the transform coefficient group scan unit 250 may scan a plurality of transform coefficient groups in at least one or more transform regions divided based on the transform region information. The transform coefficient group scan unit 250 may include a first transform region scan unit 251 and a second transform region scan unit 252 to scan the transform coefficient groups of the divided transform regions. The transform region scan unit is not limited to the first transform region scan unit 251 and the second transform region scan unit 252, and the transform block may be included in correspondence with the number of the divided transform regions.

First of all, the first transform region scan unit 251 may scan a plurality of transform coefficient groups included in the first transform region among a plurality of transform regions divided based on the transform region information (S20). Thereafter, the second transform region scan unit 252 may scan a plurality of transform coefficient groups included in the second transform region (S30). If three or more transform region scan units are included, the transform coefficient groups included in the transform region may be sequentially scanned.

According to an embodiment of the present invention, the first transform region scan unit 251 may include the transform coefficient groups in the low frequency region as compared with the second transform region scan unit 252.

As described above, according to the scan method of the present invention, the scan order is determined such that the transform coefficient groups in the low frequency region may be scanned before the transform coefficient groups in the high frequency region. As a result, the disadvantage which the transform coefficient group in the high frequency region is coded and transmitted first, and the transform coefficient groups in the low frequency region have a large scan order index may be solved.

Also, according to an embodiment of the present invention, it may be determined whether the transform block is a non-square block before obtaining transform region information. The transform coefficient group corresponding to the high frequency region is scanned first before the transform coefficient group corresponding to the low frequency region, which may cause frequent occurrence of the reduced coding efficiency if the transform block is a non-square block. Therefore, before obtaining the transform region information, it may be determined first whether the current transform block is a non-square block or not.

According to an embodiment of the present invention, various methods may be employed to determine if the transform block is a non-square block or not. For example, it is possible to determine whether the transform block is a non-square block or not by comparing the horizontal length and the vertical length of the transform block. Alternatively, information on the size and shape of the transform block may be received from the encoding apparatus, or may be determined based on at least one of the segmentation information, direction information, and may be determined based on one or more information of division information, direction information, a, 13 and pixel information of the transform block already obtained in the decoding apparatus.

Further, it may be determined based on the transform block type information indicating the type of the transform block. The transform block type information may be received from the encoding apparatus, but may be calculated based on one or more information of division information, direction information, pixel information, the horizontal and vertical length information of the transform block in the decoding apparatus. When the transform block is determined to be a non-square block in this manner, the transform coefficient group included in the transform region may be scanned for each transform region of the transform block according to the method described above with reference to FIG. 26 and FIG. 27.

Figure 28A:
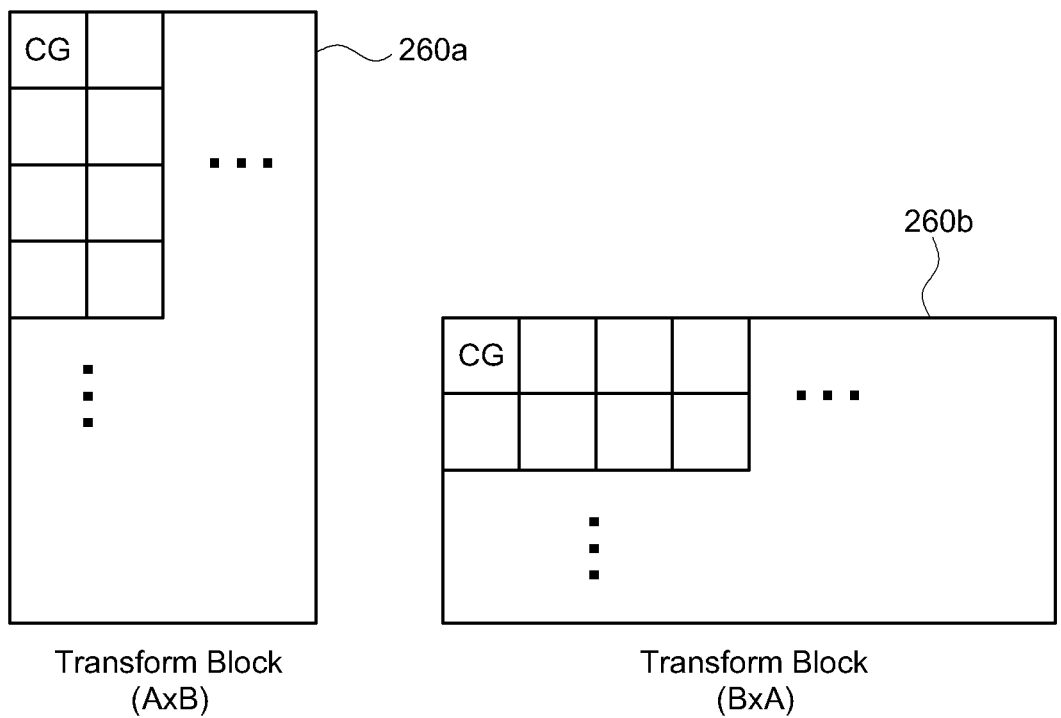
FIG. 28A and FIG. 28B are diagrams illustrating a method for scanning a transform coefficient group for a non-square transform block according to an embodiment of the present invention.
Figure 28B:
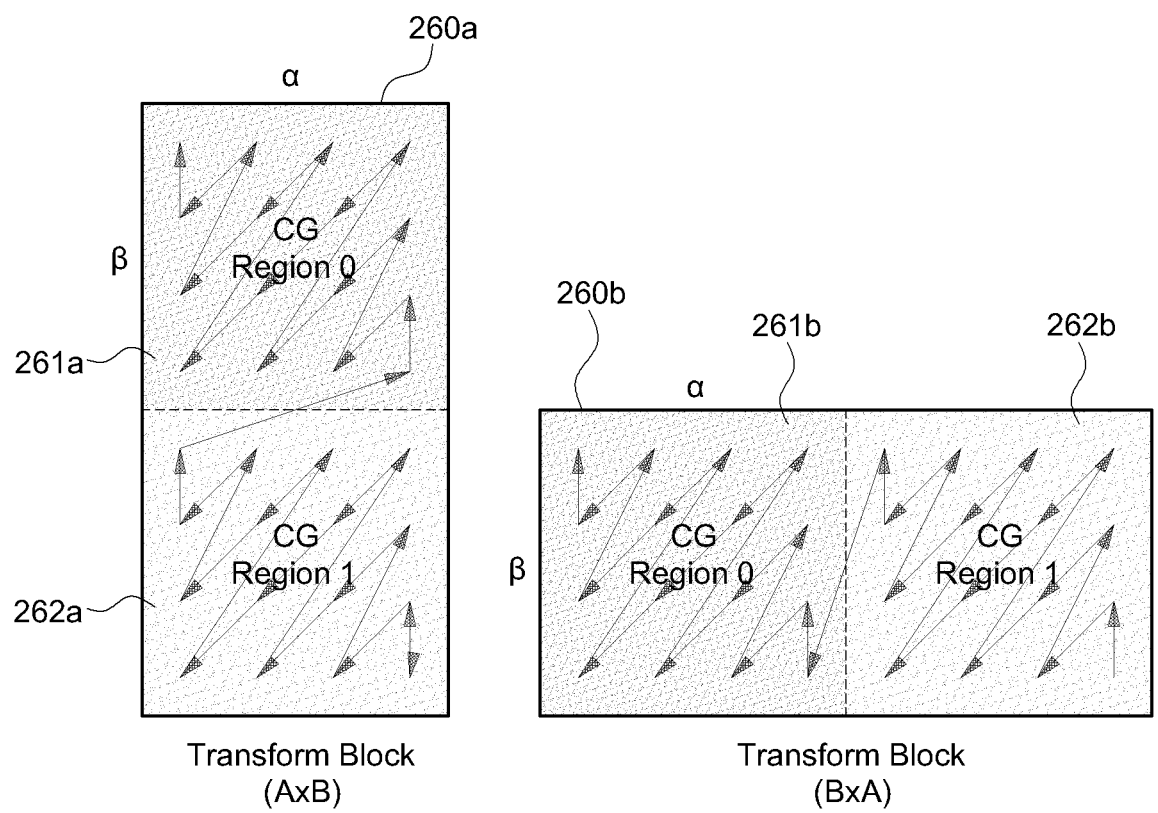

FIG. 28A and FIG. 28B illustrate a method for scanning a transform coefficient group for a non-square transform block according to an embodiment of the present invention.

Referring to FIG. 28A, the non-square transform blocks 260*a* and 260*b* of the present invention may have a horizontal length A and a vertical length B, respectively. The non-square transform blocks 260*a* and 260*b* having the A×B size may include a plurality of transform coefficient groups, and may be partitioned into a transform block region of α×β size. α and β represent the number of transform coefficient groups included in the transform block. That is, it may indicate the region having a number of an transform coefficient group for the horizontal direction and the region having P number of transform coefficient group for the vertical direction. According to an embodiment of the present invention, the transform region information may include information about α and β. In addition, the transform region information may include information indicating the horizontal and vertical lengths of the transform region. For example, when the non-square transform block 260a has a size of 8×16, α×β indicating the structure of the transform region is 2×2, and the size of the transform region for dividing the transform block 260a may be 8×8.

Such transform region information may be calculated in an upper parameter or a previous decoding process and may simply be calculated from the number obtained by dividing the smaller one of the horizontal and vertical lengths of the non-square transform block by the size of the transform coefficient block. However, the method for obtaining the transform region information in the present invention is not limited thereto.

Referring to FIG. 28B, the transform blocks 260a and 260b divided into a plurality of transform regions may scan the transform coefficient group by applying a scan method determined from an upper parameter or an upper process for each transform region. For example, when a transform block 260b having a size of 16×8 is divided into a transform region (α×β=2×2) having a size of 8×8, and the transform region and the transform coefficient group are scanned by the up-right scan method, first of all, the transform coefficient group in CG region 1 may be scanned by the up-right scan method, and then the transform coefficient group in CG region 0 may be scanned by the up-right scan method.

FIGS. 29A through 30D illustrate various methods for scanning a transform coefficient group for a non-square transform block according to an embodiment of the present invention.

Figure 29A:
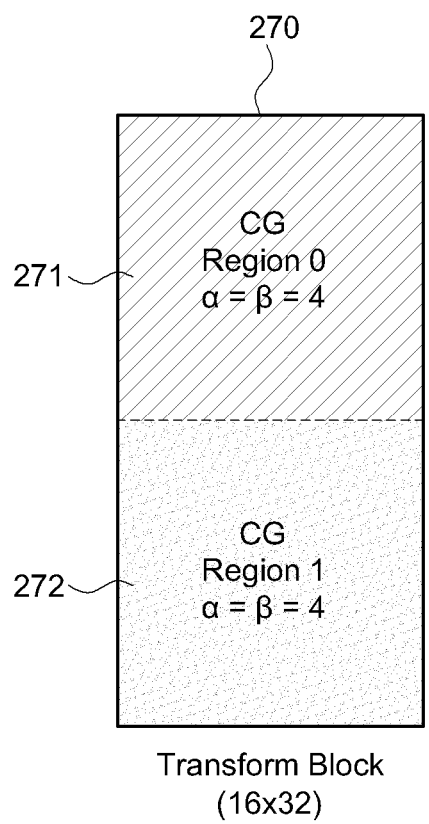
FIG. 29A to FIG. 30D are diagrams illustrating various methods of scanning a transform coefficient group for a non-square transform block according to an embodiment of the present invention.

Referring to FIGS. 29A to 30D, when the transform block 270 is divided into transform regions having a small side length of the transform block, the transform coefficient group may be scanned in various ways. As shown in FIG. 29A, when the transform block 270 has a size of 16×32, each transform region CG region 0, CG region 1 (271, 272) may have a size of 16×16. Here, α and β representing the number of transform coefficient group CG in the horizontal and vertical directions may be α=β=4.

Figures 29B, 29C:
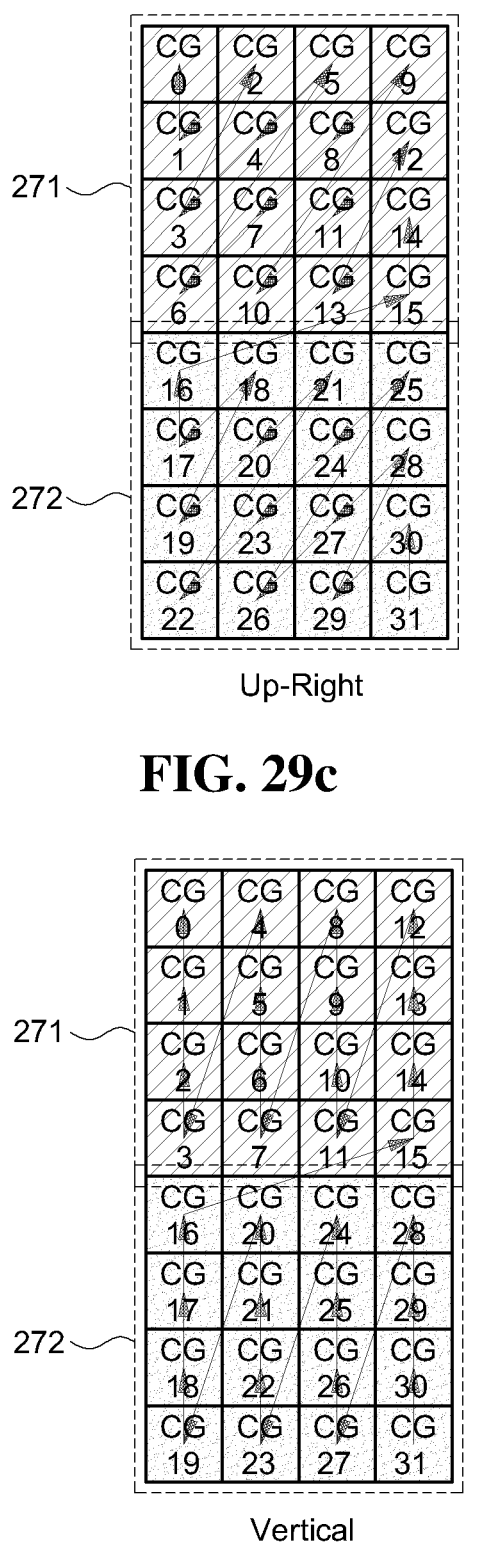

According to an embodiment of the present invention, the transform block 270 may sequentially scan the transform coefficient groups included in each transform region for each transform region. As shown in FIG. 29B, when the transform block 270 is scanned by the up-right scan method, from the 32th transform coefficient group CG 31 to the 17th transform coefficient group CG 15 in the second transform region CG region 1 are scanned in order, and then from the 16th transform coefficient group CG 15 to the first transform coefficient group CG 0 are scanned in order. Also, the case where the transform block is divided into two transform regions and the vertical scan method and the horizontal scan method are applied to the transform block is the same as that shown in FIG. 29C and FIG. 29D.

Figures 29D, 30A:
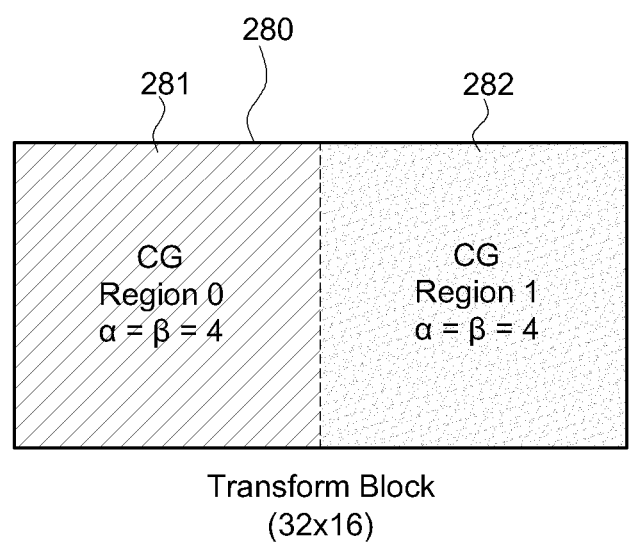

Referring to FIGS. 30A to 30D, when the transform block 280 is divided into the transform region having the small side length of the transform block 280, the transform coefficient group may be scanned in various ways. As shown in FIG. 30A, when the transform block 280 has a size of 32×16, each transform (region CG region 0, CG region 1) (281, 282) may have a size of 16×16. Here, α and β representing the number of transform coefficient groups (CG) in the horizontal and vertical directions may be α=β=4.

According to an embodiment of the present invention, the transform block 280 may sequentially scan the transform coefficient groups included in each transform region for each transform region. For example, as shown in FIG. 30B, when the transform block 280 is scanned by the up-right scan method, at first from the 32th transform coefficient group CG 31 to the 17th transform coefficient group CG 16 in the second transform region CG region 1 (282) located on right side is scanned in order, and then from the 16th transform coefficient group CG 15 to the first transform coefficient group CG 0 in the first transform region CG region 0 (281) is scanned in order. Further, as shown in FIG. 30C, when the transform block 280 is scanned by the vertical scan method, from the 32th transform coefficient group CG 31 included in the second transform region CG region 1 (282) located on right side to the 17th transform coefficient group CG 16 is scanned in order, and then, from the 16th transform coefficient group CG 15 to the first transform coefficient group CG 0 is scanned in order. The case where the transform block is divided into two transform regions, and the horizontal scan method is applied to the transform block is the same as that shown in FIG. 30D.

According to the method comprising the step for dividing the transform block into at least one or more transform regions including a plurality of transform coefficient groups; and the step for scanning the transform region for each transform region, the transform coefficient group of the low frequency region is first scanned before the transform coefficient group of the high frequency, and the scanned group is transmitted. Thus, the coding efficiency is increased.

Figures 30D, 31:
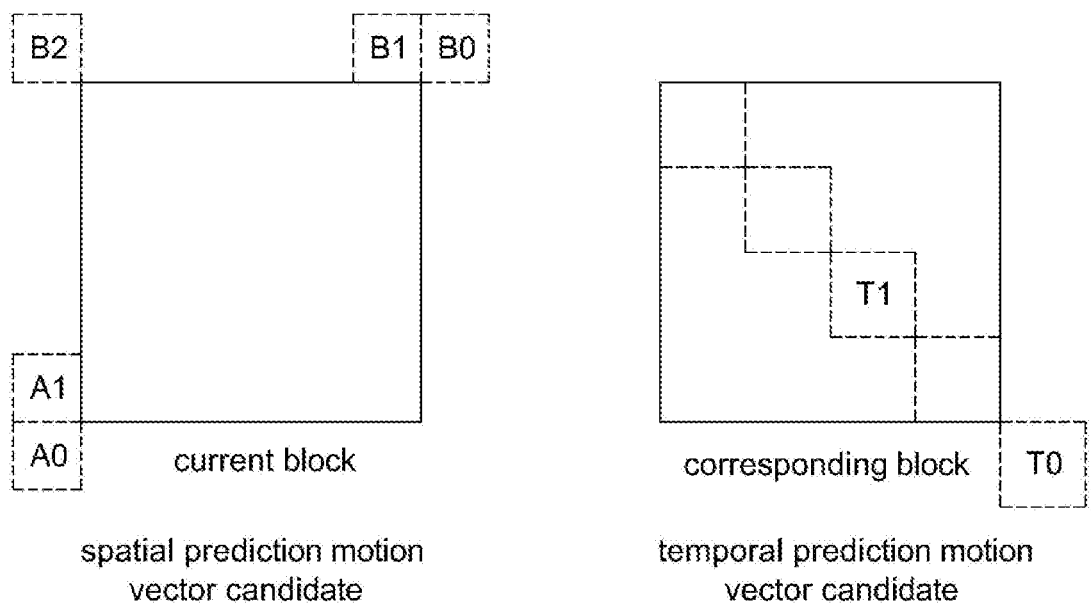
FIG. 31 is a diagram illustrating a position for obtaining a prediction motion vector candidate (MVP candidate) of a current block according to a general method.

FIG. 31 is a diagram explaining a position for obtaining a prediction motion vector candidate (MVP candidate) of a current block according to a general method.

Referring to FIG. 31, the current block may use the motion information of the spatial neighboring blocks A0, A1, B0, and B1 and the motion information of the temporal neighboring blocks T0 and T1 to construct a prediction motion vector list (MVP list). The motion information of the spatial neighboring block may be determined by using one motion information of neighboring blocks located on the left side of the current block, and one motion information of neighboring blocks located on the upper side of the current block. The motion information of the temporal neighboring block may be determined by using motion information of a neighboring block located in the lower right of the current block, or motion information of a block located in the same position as the current block in a reference image to be referred to by the current block.

In connection with the motion information of the spatial neighboring block, a piece of motion information may be searched while scanning in the order of A0→A1→scaled A0→scaled A1 for the neighboring blocks located on the left side of the current block. Then, a piece of motion information is searched while scanning in the order of B0→B1→B2 for neighboring blocks located on the upper side of the current block.

According to an embodiment of the present invention, if the A0 and A1 blocks of the current block are scanned, but the reference image to be referred to by the current block is different from the reference image referenced by the motion information of the A0 and A1 blocks, the motion information of the A0 and A1 blocks scaled to match with the reference image to be referred to by the current block may be used.

The motion information of the temporal neighboring block is scanned in the order of T0 and T1. Likewise, in this case, the motion vector of the temporal neighboring block may be used by scaling the vector as the image to be referred to by the current block.

According to an embodiment of the present invention, Advanced Motion Vector Prediction (AMVP) may use two prediction motion vectors. First of all, the motion information of the spatial neighboring block is scanned and input to the advanced motion vector prediction list (AMVP list). If the list is not filled up in this process, the motion information of the temporal neighboring block may be scanned to fill the list. If the same motion information is input to the AMVP list at the time of scanning the motion information of the neighboring block, the duplicated motion information is deleted. If the motion vector information of the temporal and spatial neighboring blocks is completed through the above process and the AMVP list is not be filled up, the AMVP list may be completed by filling (0,0) in the unfilled list.

Figure 32:
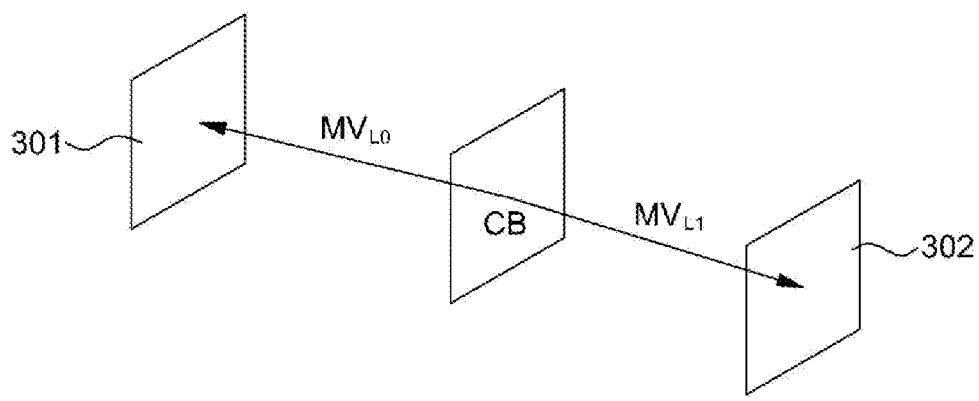
FIG. 32 to FIG. 33B are diagrams illustrating a method for constructing a prediction motion vector list of a current block according to a general method.
Figure 33A:
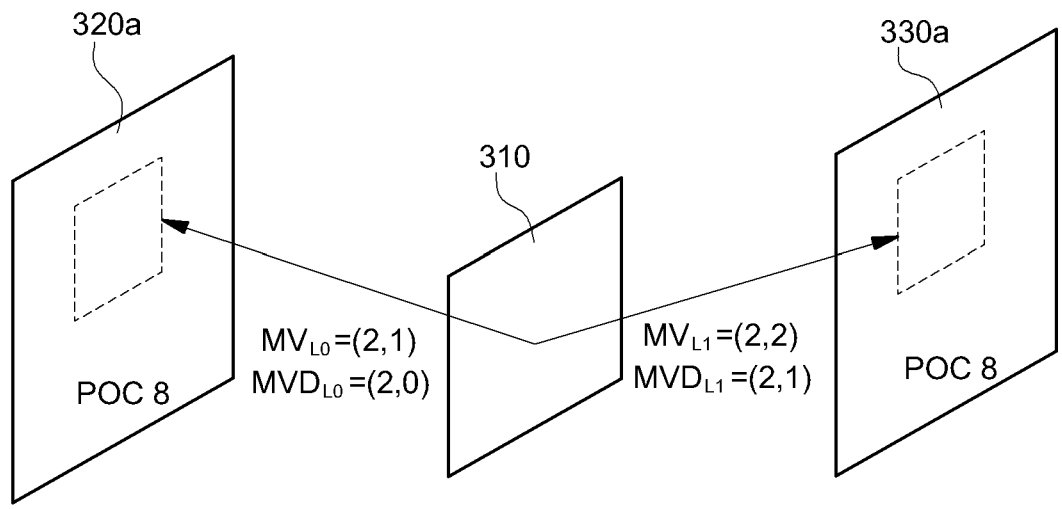
Figure 33B:
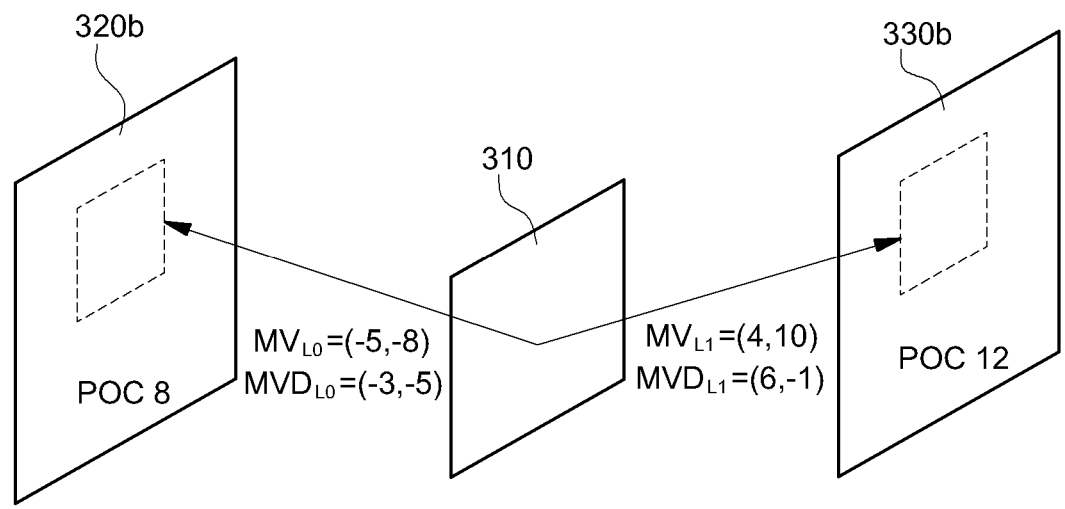

FIG. 32 to FIG. 33B illustrate a method for constructing the AMVP list of a current block according to a general method.

Referring to FIG. 32, when a current block CB performs bidirectional prediction, a motion vector may be obtained from a reference picture 301 for a first direction, and a reference picture 302 for a second direction. As shown in the lower unit of FIG. 32, the AMVP list for inter-picture prediction of the current block may include at least one or more motion vector prediction candidates (MVP candidates) for each direction. Thereafter, the differential value between the prediction motion vector of any one selected from of the motion vector prediction candidates described in the AMVP list, and the motion vector of the current block may be calculated to acquire and encode the differential motion vector.

According to an embodiment of the present invention, the selected prediction motion vector having the highest coding efficiency may be selected among the motion vector prediction candidates included in the AMVP list. The selected prediction motion vector may be encoded in the form of index information indicating the prediction motion vector and may be transmitted along with the differential motion vector.

FIG. 33A illustrates a method for constructing the AMVP list of a current block according to a general method in the case where the reference images 320a and 330a in both directions referred to by the current block 310 are the same. FIG. 33B illustrates a method for constructing the AMVP list of a current block according to a general method in the case where the reference pictures 320b and a reference picture 330b in both directions referenced by the reference picture 310 are different from each other.

Referring to FIG. 33A, a reference image 320a in the first direction and a reference image 330a in the second direction which are referenced by the current block 310 for inter-picture prediction a may be equal such as POC=8. In this way, when the reference images 320a and 330a in both directions referenced by the current block 310 are the same, the motion vector $MV_{L0}$ for the first direction L0 and the motion vector $MV_{L1}$ for the second direction L1 of the current block 310 may be very similar. However, the prediction motion vector list of the current block according to the general method does not reflect the above similarity, and acquires motion information from neighboring blocks of the current block independently for each direction, and constructs a prediction motion vector list as shown in Table 3 below.

TABLE 3

| Index | a predicted motion vector list of the first direction(AMVP_L0) | a predicted motion vector list of the second direction(AMVP_L1) |
|---|---|---|
| 0 | $MV\_A0_{L0}$ = (4, 1) | $MV\_A0_{L1}$ = (1, 1) |
| 1 | $MV\_Col_{L0}$ = (0, 1) | $MV\_Col_{L1}$ = (0, 1) |

When the reference picture 320a in the first direction and the reference picture 330a in the second direction are the same for the current block 310, the motion vectors for the respective directions are likely to be similar. Referring again to FIG. 33A, it is confirmed that the motion vector $MV_{L0}$ for the first direction and the motion vector $MV_{L1}$ for the second direction of the current block 310 are similar to (2,1) and (2,2), respectively. However, as described above, according to the general method for constructing a prediction motion vector list, the prediction motion vector list for each direction is constructed independently.

Therefore, in order to construct the predicted motion vector list of the second direction, the motion vectors of neighboring blocks of the current block 310 having a relatively low degree of correlation with the motion vector $MV_{L1}$ for the second direction are used. Therefore, the coding efficiency of the motion vector $MV_{L1}$ may be reduced. However, the prediction motion vector list according to the general method constitutes a list independently for each direction, and $MVD_{L0}$=(2, 0), and $MVD_{L1}$=(2, 1) which are the differential motion vectors indicating a difference value between a prediction motion vector selected in the list and a motion vector in each direction are acquired and then, they may be transmitted to the decoding apparatus. Referring to FIG. 33B, even if the reference picture 320b in the first direction and the reference picture 330b in the second direction are different from each other, the current block 310 refers to, when constructing the prediction motion vector list according to the general method, the prediction motion vector list for each direction may be constructed independently. The constructed prediction motion vector list shown in Table 4 below.

TABLE 4

| Index | a predicted motion vector list of the first direction(AMVP_L0) | a predicted motion vector list of the second direction(AMVP_L1) |
|---|---|---|
| 0 | $MV\_A1_{L0}$ = (−2, −3) | $MV\_A1_{L1}$ = (0, 6) |
| 1 | $MV\_B0_{L0}$ = (−1, −11) | $MV\_B0_{L1}$ = (−2, 11) |

Even if the reference picture 320b in the first direction and the reference picture 330b in the second direction are not the same for the current block 310, since the current block 310 refers to the above-described reference pictures, it is impossible to exclude the possibility that the motion vectors for each direction become similar, depending on the distance and the degree of correlation of the reference pictures. However, as described above, according to the general method for constructing a prediction motion vector list, the prediction motion vector list for each direction is constructed independently.

The motion vector $MV_{L0}$ for the first direction and the motion vector $MV_{L1}$ for the second direction are (−5, −8) and (4,10), respectively, as shown in FIG. 33B. In addition, as described in Table 2, a prediction motion vector list may be constructed. In this case, if AMVP_L0_0 and AMVP_L1_1 are selected as prediction motion vectors, the differential motion vectors $MVD_{L0}$, and $MVD_{L1}$ transmitted to the decoding apparatus may be (−3, −5) and (6, −1), respectively.

In this manner, when constructing the AMVP list by the general method, and when the motion information of the neighboring blocks of the current block in constructing the AMVP for the second direction is used, if the reference picture in the second direction has the degree of relatively high correlation with respect to the reference picture in the first direction as compared with the current picture, the coding efficiency of the motion vector may be lowered.

Therefore, the present invention proposes a method and apparatus for constructing the AMVP list according to an embodiment of the present invention, which uses a motion vector for a first direction and construct the AMVP list of the second direction when a current block performs bidirectional prediction.

Figure 34:
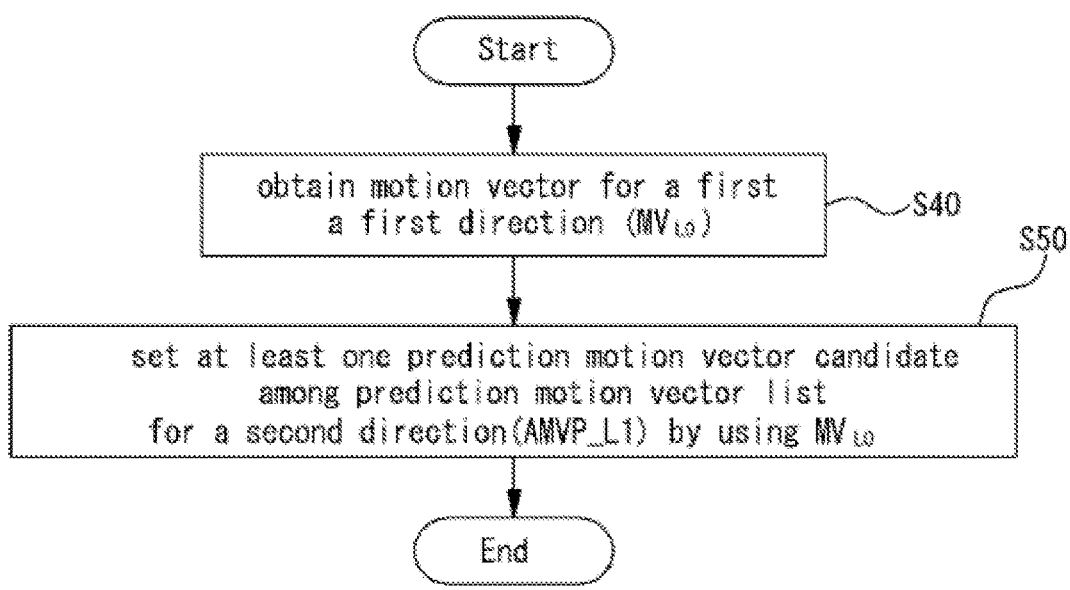
FIG. 34 is a flowchart illustrating a method for constructing a prediction motion vector list according to an embodiment of the present invention.
Figure 35:
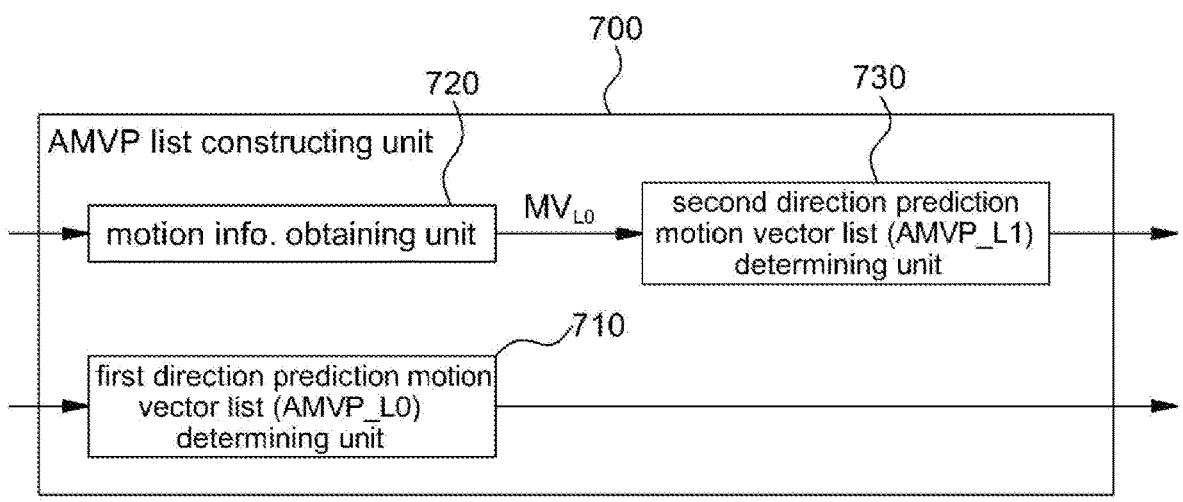
FIG. 35 is a flowchart illustrating an apparatus for constructing a prediction motion vector list according to an embodiment of the present invention.

FIG. 34 and FIG. 35 illustrate a flowchart and an apparatus for explaining a method of constructing the AMVP list according to an embodiment of the present invention.

Referring to FIG. 34 and FIG. 35, the prediction motion vector list (AMVP list) constructing unit 700 may include a first direction prediction motion vector list determining unit 710, a motion information obtaining unit 720, and a second direction prediction motion vector list determining unit 730. The first direction prediction motion vector list determining unit 710 may set the prediction motion vector list (AMVP_L0) in the first direction. The predicted motion vector list in the first direction may be composed of a predicted motion vector candidate (MVP candidate) in a first direction obtained from motion information of temporal and spatial neighboring blocks of the current block. The predicted motion vector list in the first direction may include two or more predicted motion vector candidates, and an index indicating each of predicted motion vector candidates may be given. The predicted motion vector list in the first direction may be constructed according to the method described with reference to FIG. 3, but the present invention is not limited thereto. In addition, the motion information obtaining unit 720 may obtain the motion vector ($MV_{L0}$) for the first direction (S40). The motion vector may follow a method of obtaining a motion vector of a current block in inter-picture prediction of a conventional video codec, but the present invention is not limited thereto.

Thereafter, the second direction prediction motion vector list determining unit 730 may set the predicted motion vector list (AMVP_L1) in the second direction (S50). At least one or more candidates of the predicted motion vector candidates of the second direction constituting the predicted motion vector list of the second direction may be set using the motion vector ($MV_{L0}$) for the first direction. According to an embodiment of the present invention, the predicted motion vector candidate of the second direction which is set using the motion vector for the first direction, may be set by copying the motion vector for the first direction as it is. Further, the motion vector for the first direction may be modified and set by using various methods such as scaling. Also, the predicted motion vector candidate of the second direction may be included in the predicted motion vector list (AMVP_L1) of the second direction.

Since the reference pictures used for the bidirectional prediction of the current block are likely to have a high correlation with each other, there is a high possibility that the motion vector ($MV_{L0}$) for the first direction and the motion vector ($MV_{L1}$) for the second direction obtained in both directions are similar. Therefore, when obtaining at least one or more predicted motion vector candidates of the second direction by using the motion vector ($MV_{L0}$) for the first direction, it becomes possible to encode the differential motion vector ($MVD_{L1}$) for the second direction, which is smaller as compared with the conventional method, and to transmit the encoded differential motion vector.

Further, the second direction prediction motion vector list determining unit 730 simultaneously obtains at least one or more predicted motion vector candidates of second direction by using the motion vectors of the temporal neighboring blocks and the spatial neighboring blocks of the current block. Therefore, the predicted motion vector list (AMVP_L1) of the second direction may be constructed together with the predicted motion vector candidates of the second direction obtained by using the motion vector for the first direction. In the present invention, the number and acquisition order of predicted motion vector candidates of the second direction which are set by using the motion vector for the first direction, and the predicted motion vector candidates of the second direction which are set in a general manner; and the index assignment method for the predicted motion vector candidates is not limited FIG. 36 and FIG. 37 illustrate a flowchart and a configuration apparatus related to method for constructing a prediction motion vector list according to another embodiment of the present invention.

Figure 36:
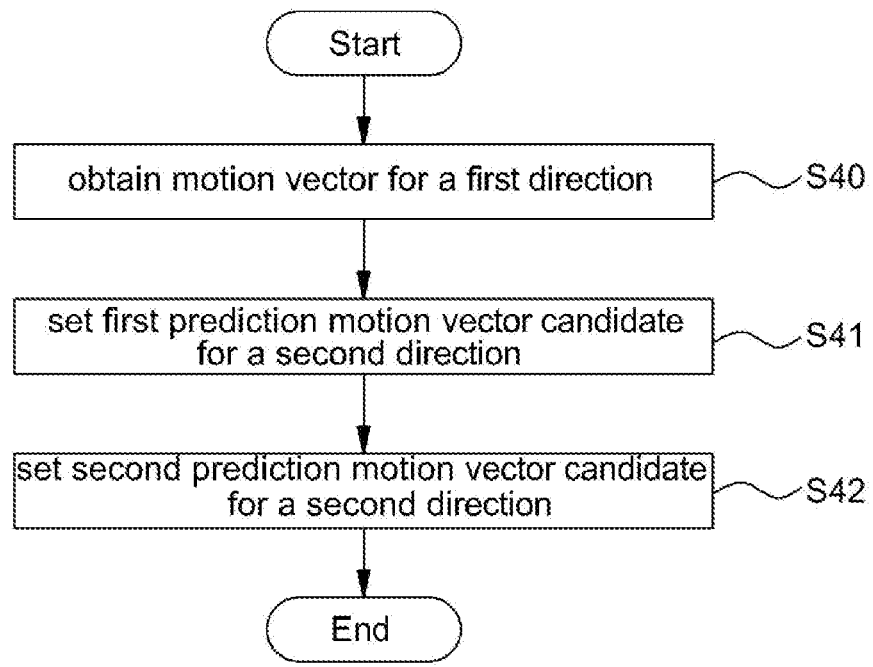
FIG. 36 and FIG. 37 are diagrams illustrating a flowchart and a configuration apparatus for a method for constructing a prediction motion vector list according to another embodiment of the present invention.

Referring to FIG. 36, as described with reference to FIGS. 34 and 35 in the foregoing paragraphs, the motion vector for a first direction of a current block may be obtained (S40). The acquisition of the motion vector for the first direction may be performed irrespective of the order of constructing the predicted motion vector list of the first direction. The acquisition may also be performed after obtaining the motion vector for the first direction through the prediction motion vector list structure of the first direction, or may be acquired through the information received independently of the prediction motion vector list structure of the first direction and the present invention is not limited thereto.

Figure 37:
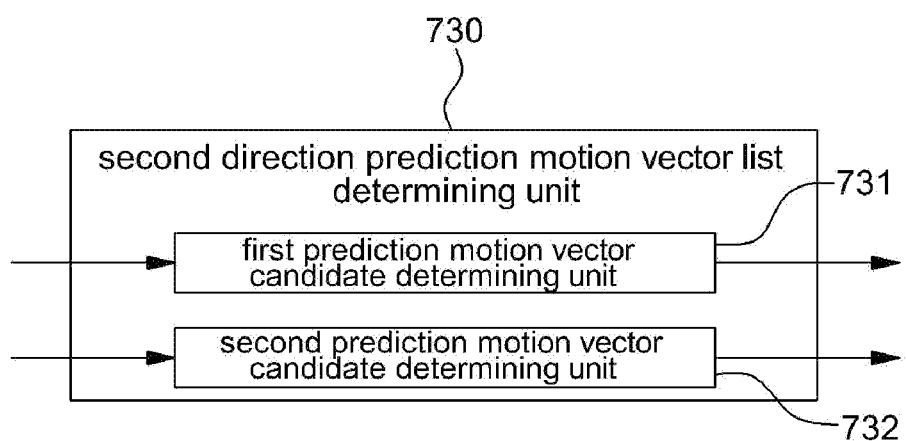

Referring to FIG. 37 together with FIG. 36, the second direction prediction motion vector list determining unit 730 includes a first prediction motion vector candidate determining unit 731 and a second prediction motion vector candidate determining unit 732. The first predicted motion vector candidate determining unit 731 sets the first predicted motion vector candidates, and the first prediction motion vector candidates may be prediction motion vector candidates set as prediction motion vector candidates constituting the prediction motion vector list of the second direction by using the motion vector ($MV_L$) for the first direction (S41). The first predicted motion vector candidate may be at least one or more predicted motion vector candidates.

The first predicted motion vector candidate may have the highest correlation degree with the motion vector of the current block among the predicted motion vector candidates. Accordingly, the coding efficiency may be improved by allocating the first predicted motion vector candidate to the index having the smallest code word in constructing the first predicted motion vector list. According to an embodiment of the present invention, if the number of the first prediction motion vector candidates is more than two, the first prediction motion vector candidate may increase the coding efficiency by allocating indices in the order of having small code words.

Regardless of an order, the second prediction motion vector candidate determining unit 732 may set at least one or more predicted motion vector candidates constituting the predicted motion vector list of the second direction by using the spatially and temporally neighboring blocks of the current block (S42), independently from the first prediction motion vector candidate determining unit 731. The at least one or more predicted motion vector candidates may be referred to as a second predicted motion vector candidate. The second predicted motion vector candidate is obtained by a method for obtaining a general prediction motion vector described with reference to FIG. 3, and may construct a prediction motion vector list (AMVP_L1) of the second direction together with the first prediction motion vector candidate. In this case, when constructing the prediction motion vector list for the second direction, the number, the acquisition order, and the index allocation method of the first prediction motion vector candidates and the second prediction motion vector candidates are not limited and it is acceptable if the method may be performed by the person in the art.

As described above, in the method and apparatus for constructing a prediction motion vector list according to an embodiment of the present invention, when the current block performs bidirectional inter-picture prediction, the coding efficiency may be improved by obtaining at least one or more candidates of the predicted motion vector candidates of the second direction based on a motion vector for the first direction.

Figure 38A:
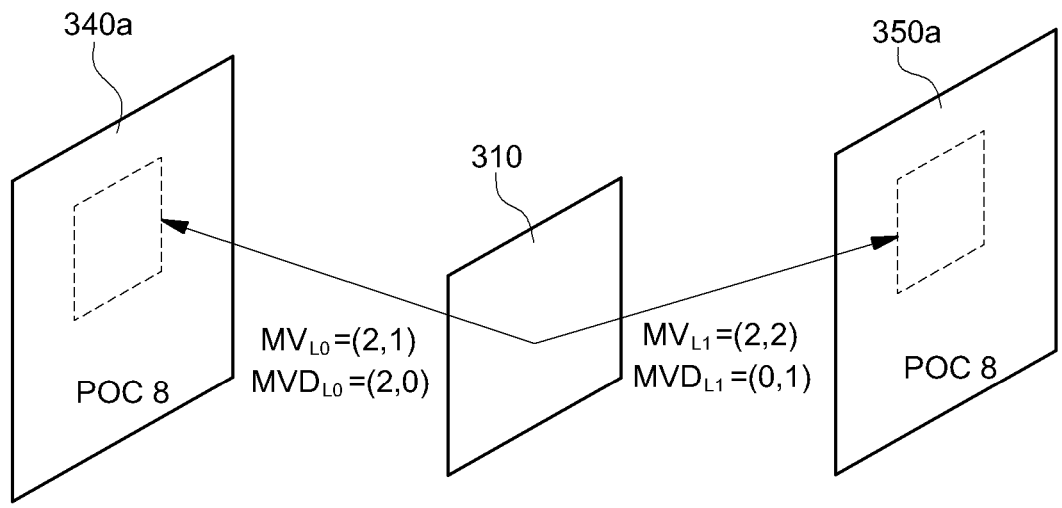
FIG. 38A and FIG. 38B are diagrams illustrating a method of constructing a prediction motion vector list according to an embodiment of the present invention.
Figure 38B:
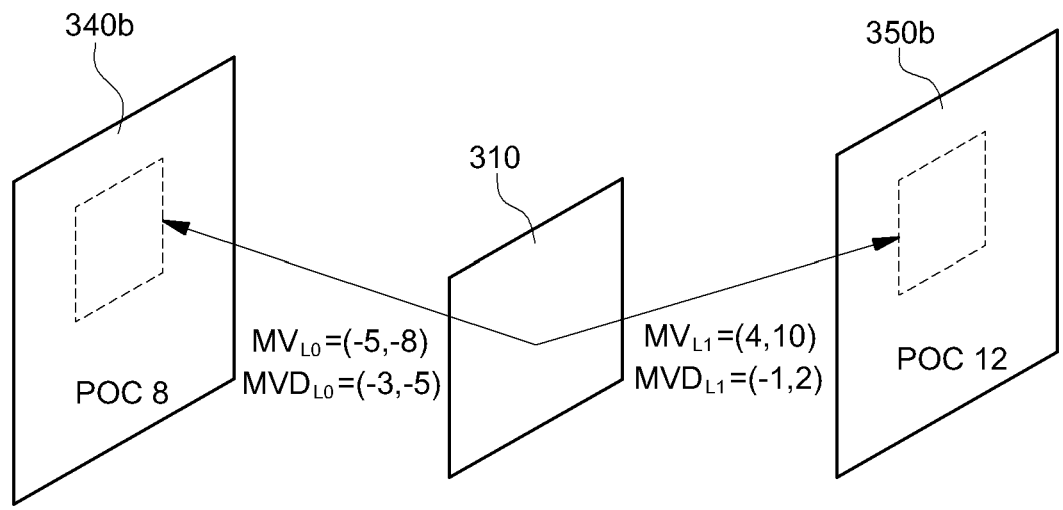

FIG. 38A and FIG. 38B illustrate a method for constructing a prediction motion vector list according to an embodiment of the present invention.

Referring to FIG. 38A, if the current block 310 performs bidirectional prediction and the pictures 340a and 350a referenced in the first direction and the second direction are equal to POC=8, the motion vector for the first direction ($MV_{L0}$) may be used for constructing the predicted motion vector list of the second direction. For example, when the motion vector ($MV_{L0}$) for the first direction of the current block is (2,1), ($MV_{L0}$)=(2,1) may be set as the first predicted motion vector candidate of the second direction. According to an embodiment of the present invention, the first predicted motion vector candidate may have the shortest code word among the indices constituting the predicted motion vector list of the second direction, but the present invention is not limited thereto. It is acceptable to allocate to any index of the predicted motion vector lists of the second direction.

Referring to FIG. 38A together with FIG. 33A, when a person in the art wants to construct a predicted motion vector list of the second direction under the condition that an image referred to by the current block 310 is identical for each direction in performing bi-direction prediction, in a case that the list is constructed by obtaining motion information is obtained from neighboring blocks of the current block independently of the motion information of the first direction, the differential motion vector in the second direction to be transmitted may be (2,1). However, when the motion vector for the first direction is used as the first predicted motion vector candidate of the second direction, the differential motion vector in the second direction may be (0, 1). The configuration of the AMVP list according to an embodiment of the present invention is shown in Table 5 below.

TABLE 5

| Index | a predicted motion vector list of the first direction(AMVP_L0) | a predicted motion vector list of the second direction(AMVP_L1) |
|---|---|---|
| 0 | MV_A1$_{L0}$ = (−2, −3) | $MV_{L0}$ = (2, 1) |
| 1 | MV_B0$_{L0}$ = (−1, −11) | MV_B0$_{L1}$ = (−2, 11) |

As described above, since the motion vector for the first direction and the motion vector for the second direction are highly correlated, the method of constructing the prediction motion vector list according to the present invention for setting the first predicted motion vector of the second direction by using the motion vector for the first direction may encode a differential motion vector MVD that is smaller as compared with the conventional method, and transmit the encoded vector.

FIG. 38B is a diagram illustrating a method for setting the first predicted motion vector candidate constituting the predicted motion vector list of the second direction by using the motion vector $MV_{L0}$ for the first direction, when the current block 310 performs bi-directional prediction, and the picture 340b referred to in the first direction is different from the picture 350b referred to for the second direction. In connection with the first prediction motion vector candidate, a motion vector for the first direction may be obtained by using reference picture information such as POC of reference pictures for the first direction and the second direction once again. For example, if the reference picture 340b in the first direction of the current block 310 is POC=8, the reference picture 350b for the second direction is POC=12, and the motion vector $MV_{L0}$ for the first direction is (5, 8), the first predicted motion vector of the second direction may be scaled (−5, 8) based on the POC as shown in Table 6 below.

TABLE 6

| Index | a predicted motion vector list of the first direction(AMVP_L0) | a predicted motion vector list of the second direction(AMVP_L1) |
|---|---|---|
| 0 | MV_A1$_{L0}$ = (−2, −3) | Scaled_$MV_{L0}$ = (5, 8) |
| 1 | MV_B0$_{L0}$ = (−1, −11) | MV_B0$_{L1}$ = (−2, 11) |

Referring to FIG. 33B together with FIG. 38B, under the condition that the images that the current block 310 refers to for each direction in bidirectional prediction are different, in order to construct the prediction motion vector list (AMVP_L1) of the second direction, there is a case that motion information may be obtained from neighboring blocks of the current block independently from motion information for the first direction. At this time, the differential motion information ($MVD_{L1}$) of the second direction to be transmitted may be (6, −1). However, when using the scaled motion vector (Scaled_$MV_L$) for the first direction as the first predicted motion vector candidate, the differential motion vector ($MVD_{L1}$) of the second direction may be (−1, 2).

In this way, the motion vector ($MV_{L0}$) for the first direction and the motion vector ($MV_{L1}$) for the second direction have a very high correlation degree. Therefore, a method of constructing the prediction motion vector list of the present invention for scaling a motion vector for a first direction based on POC (Scaled_$MV_{L0}$), and for setting a first prediction motion vector ($MV_{L1}$) of a second direction may encode the differential motion vector ($MVD_{L1}$), which is relatively smaller than that of the conventional method, and may transmit the encoded vector. As a result, the coding efficiency may be improved. According to an embodiment of the present invention, in order to improve coding efficiency, the first predicted motion vector candidate may have the shortest code word among the indices constituting the predicted motion vector list of the second direction. However, the present invention is not limited to thereof. The present invention discloses a method of scaling a motion vector for a first direction based on POC as a first prediction motion vector candidate of the second direction, but the method of scaling is not limited to thereof.

Figure 39:
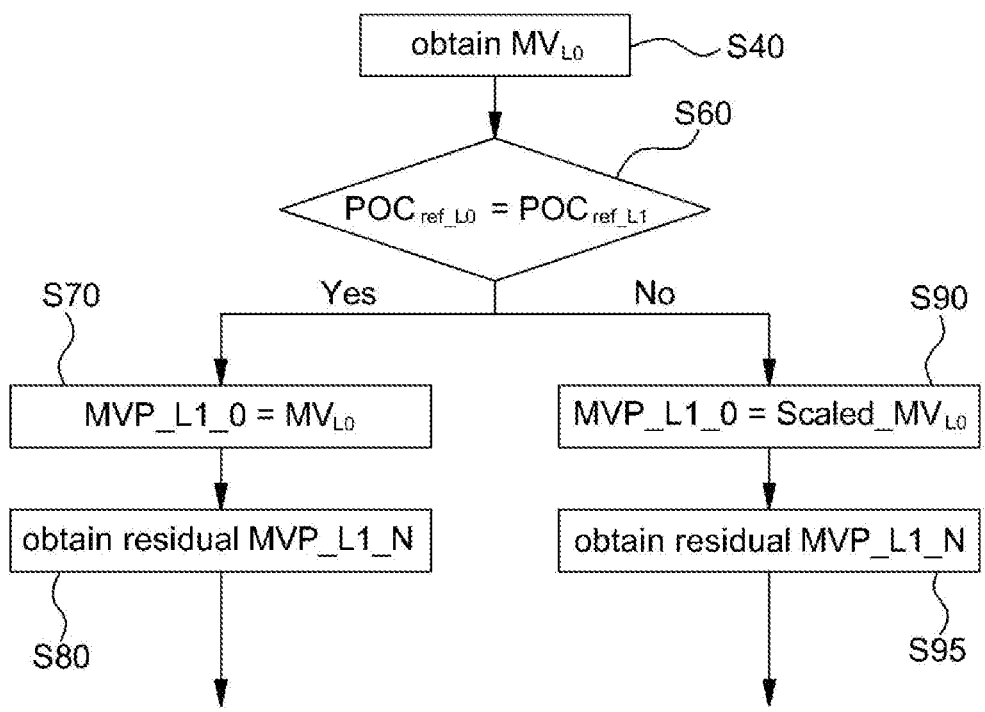
FIG. 39 is a flowchart illustrating a method for constructing a prediction motion vector list according to another embodiment of the present invention.

FIG. 39 is a flowchart illustrating a method for constructing a prediction motion vector list according to another embodiment of the present invention. Referring to FIG. 39, in order to construct the AMVP list of the current block, a motion vector ($MV_{L0}$) for the first direction is acquired (S40). The motion vector for the first direction may be obtained by using a prediction motion vector candidate of the predicted motion vector list of the first direction received from the encoder to the decoder, and the differential motion vector. Alternatively, the motion vector may be received from the encoder. But the present invention does not limit the method for obtaining the motion vector for the first direction.

Thereafter, it is determined whether the picture information ($POC_{ref\_L0}$) of the reference picture for the first direction and the picture information ($POC_{ref\_L1}$) of the reference picture for the second direction used in bidirectional prediction of the current block are same or not (S60). For example, it may be determined whether or not the first and second reference pictures are identical based on picture information such as POC.

If the picture information of the reference picture for the first direction and the picture information of the reference picture for the second direction are same (Yes in S60), the motion vector ($MV_{L0}$) for the first direction may be set as the first predicted motion vector candidate (MVP_L1_0) constituting the predicted motion vector list (AMVP_L1) of the second direction (S70). The first predicted motion vector candidate may be at least one or more predicted motion vector candidates. In addition, at least one or more residual predicted motion vector candidates (MVP_L1_N) constituting the predicted motion vector list of the second direction may be set according to a general method (S80). An acquisition sequence of the first prediction motion vector candidate of the second direction set by copying a motion vector for the first direction, and a residual prediction motion vector candidate of the second direction obtained by a general method; and the method of allocating an index when constructing a prediction motion vector list of a second direction are not limited.

If the picture information of the reference picture in the first direction and the picture information of the reference picture in the second direction are different (No in S60), a scaled value (Scaled_$MV_{L0}$) of the motion vector for the first direction may be set as the first predicted motion vector candidate (MVP_L1_0) constituting the predicted motion vector list in the second direction (S90). The first predicted motion vector candidate may be at least one or more predicted motion vector candidates. In addition, at least one or more residual predicted motion vector candidates (MVP_L1_N) constituting the predicted motion vector list of the second direction may be set according to a general method (S95). An acquisition sequence of the first predicted motion vector candidate of the second direction set to a value obtained by scaling a motion vector for the first direction, and the residual predicted motion vector candidates of the second direction obtained in a general manner; and the method of allocating an index when constructing a prediction motion vector list of a second direction are not limited.

The AMVP list constructed according to the above method uses a motion vector for a first direction having a high degree of correlation in an inter-picture prediction when constructing a prediction motion vector list in a second direction. Thus, a method for constructing a prediction motion vector list in which coding efficiency of inter-picture prediction is improved a method of constructing a vector list may be provided. In the bi-directional prediction, as a result of considering one of the whether or not the picture information of the reference picture for the first direction and the picture information of the reference picture for the second direction are same or not, and the distance between the reference pictures and the current picture are to be considered, the coding efficiency may be increased by setting at least one or more predicted motion vector candidates constituting the prediction motion vector list of the second direction.

It will be apparent to those skilled in the art that the present invention described above is not limited to the above-described embodiment and the accompanying drawings, and various replacements, modifications, and variations may be made in the present invention without departing from the spirit or scope of the invention as defined in the appended claims.

What is claimed is:

1. A method of decoding a video signal, the video signal including transform block including at least one transform coefficient group, comprising:
   determining the transform block is a non-square block by comparing a horizontal length and a vertical length of the transform block;
   if the transform block is the non-square block, receiving a bitstream including transform region information indicating at least two transform regions, the transform regions included in a transform block;
   partitioning the transform block into the transform regions based on the transform region information;
   obtaining a scan method of the transform regions, respectively; and
   scanning a plurality of transform coefficient groups included in the transform regions based on the scan method,
   wherein a first transform region of the transform regions includes a first transform coefficient groups, and a second transform region of the transform regions includes a second transform coefficient groups,
   wherein the first and the second transform coefficient groups include at least one transform coefficients, respectively,
   wherein the scan method comprising a scan order for coding the transform coefficients of the first and the second transform coefficient groups,
   wherein when the first transform coefficient groups are included in a low frequency region, the transform coefficients of the first transform coefficient groups are scanned prior to the transform coefficients of the second transform coefficient groups, and
   wherein the scan method of the transform regions in the transform block indicates at least two scan methods.

2. The method of claim 1, wherein the transform region information is determined based on at least one of horizontal length and vertical length.

3. The method of claim 1, wherein a first scan method for scanning the transform coefficients of the first transform region is different from a second scan method for scanning the transform coefficients of the second transform region.

4. The method of claim 1, wherein the transform block is scanned transform region including transform coefficient groups in a lower frequency region.

5. The method of claim 1, wherein the transform region is scanned the transform coefficient groups in the transform region using a diagonal scan method.

6. A non-transitory computer readable storage medium stored with code thereon for use by an apparatus for decoding a video signal, which when executed by a processor, the video signal including transform block including at least one transform coefficient group, causes the apparatus to perform:
   determining the transform block is a non-square block by comparing a horizontal length and a vertical length of the transform block;

if the transform block is the non-square block, receiving a bitstream including transform region information indicating at least two transform regions, the transform regions included in a transform block;

partitioning the transform block into the transform regions based on the transform region information;

obtaining a scan method of the transform regions, respectively; and scanning a plurality of transform coefficient groups included in the transform regions based on the scan method, wherein a first transform region of the transform regions includes a first transform coefficient groups, and a second transform region of the transform regions includes a second transform coefficient groups, wherein the first and the second transform coefficient groups include at least one transform coefficients, respectively, wherein the scan method comprising a scan order for coding the transform coefficients of the first and the second transform coefficient groups, wherein when the first transform coefficient groups are included in a low frequency region, the transform coefficients of the first transform coefficient groups are scanned prior to the transform coefficients of the second transform coefficient groups, and wherein the scan method of the transform regions in the transform block indicates at least two scan methods.

7. The medium of the claim 6, wherein the transform region information is determined based on at least one of horizontal length and vertical length.

8. The medium of claim 6, wherein a first scan method for scanning the transform coefficients of the first transform region is different from a second scan method for scanning the transform coefficients of the second transform region.

9. The medium of claim 6, wherein the transform block is scanned transform region including transform coefficient groups in a lower frequency region.

10. The medium of claim 6, wherein the transform region is scanned the transform coefficient groups in the transform region using a diagonal scan method.

11. The method of claim 1, wherein the transform region information is determined based on whether the transform coefficient groups are included in a low frequency region or a high frequency region.

12. The method of claim 1, wherein the first transform region of a low frequency region is scanned prior to the second transform region of a high frequency region.

13. The method of claim 1, wherein the scan method includes a first scan order between the transform regions of the transform block, a second scan order between the transform coefficient groups of any transform region, and a third scan order between the transform coefficients of any transform group.

14. The medium of claim 6, wherein the transform region information is determined based on whether the transform coefficient groups are included in a low frequency region or a high frequency region.

15. The medium of claim 6, wherein the first transform region of a low frequency region is scanned prior to the second transform region of a high frequency region.

16. The medium of claim 6, wherein the scan method includes a first scan order between the transform regions of the transform block, a second scan order between the transform coefficient groups of any transform region, and a third scan order between the transform coefficients of any transform group.

\* \* \* \* \*